United States Patent
Chung et al.

(10) Patent No.: US 10,923,995 B2
(45) Date of Patent: Feb. 16, 2021

(54) ADHESIVE LAMINATE CORE MANUFACTURING APPARATUS AND CORE LAMINATOR THEREFOR

(71) Applicant: POSCO DAEWOO CORPORATION, Seoul (KR)

(72) Inventors: Il Gwen Chung, Seoul (KR); Duk Kyoun Woo, Cheonan-si (KR); Chan Jung Kim, Cheonan-si (KR); Chang Don Park, Cheonan-si (KR)

(73) Assignee: POSCO DAEWOO CORPORATION, Seoul (KR)

( * ) Notice: Subject to any disclaimer, the term of this patent is extended or adjusted under 35 U.S.C. 154(b) by 283 days.

(21) Appl. No.: 16/086,310

(22) PCT Filed: Jun. 16, 2016

(86) PCT No.: PCT/KR2016/006406
§ 371 (c)(1),
(2) Date: Sep. 18, 2018

(87) PCT Pub. No.: WO2017/159926
PCT Pub. Date: Sep. 21, 2017

(65) Prior Publication Data
US 2019/0109521 A1    Apr. 11, 2019

(30) Foreign Application Priority Data
Mar. 18, 2016    (KR) .................. 10-2016-0032876

(51) Int. Cl.
*B23P 19/00*       (2006.01)
*H02K 15/00*       (2006.01)
(Continued)

(52) U.S. Cl.
CPC ............ *H02K 15/02* (2013.01); *B32B 15/011* (2013.01); *H01F 41/0233* (2013.01); *B32B 2457/00* (2013.01)

(58) Field of Classification Search
CPC ... B32B 2457/00; B32B 15/011; H02K 15/02; H01F 41/0233
See application file for complete search history.

(56) References Cited

U.S. PATENT DOCUMENTS

| 4,464,826 A | * | 8/1984 | Bair ..................... H02K 15/024 29/593 |
| 5,799,387 A | * | 9/1998 | Neuenschwander .. B21D 28/02 29/598 |

(Continued)

FOREIGN PATENT DOCUMENTS

| JP | H5-304037 A | 11/1993 |
| JP | 2009-297758 A | 12/2009 |

(Continued)

OTHER PUBLICATIONS

International Search Report in International Application No. PCT/KR2016/006406 dated Dec. 9, 2016, 2pages.

*Primary Examiner* — Paul D Kim
(74) *Attorney, Agent, or Firm* — Park, Kim & Suh, LLC

(57) ABSTRACT

A core laminator of an adhesive laminate core manufacturing apparatus includes a heating unit heating an adhesive interposed between laminar members to integrate the laminar members to form a laminate core, a pinch unit rotatably provided at a lower side of the heating unit which applies a lateral pressure to the laminate core, a squeeze unit including a cylinder rotatably provided at an upper side of the heating unit and a squeezer fixed in the cylinder to align the laminar members in a straight line, a guide provided in the heating
(Continued)

unit for guiding a movement of the laminar members, and a driving unit for selectively rotating the pinch unit and the squeeze unit.

15 Claims, 22 Drawing Sheets

(51) Int. Cl.
    *H02K 15/02*     (2006.01)
    *H01F 41/02*     (2006.01)
    *B32B 15/01*     (2006.01)

(56) References Cited

U.S. PATENT DOCUMENTS

| | | | |
|---|---|---|---|
| 6,745,458 B2* | 6/2004 | Neuenschwander | B21D 28/02 29/596 |
| 8,276,426 B2* | 10/2012 | Musat | B21D 28/22 72/336 |
| 10,201,844 B2* | 2/2019 | Nishinaka | B05D 1/26 |
| 10,350,868 B2* | 7/2019 | Chung | H02K 15/022 |
| 10,666,119 B2* | 5/2020 | Chung | B32B 38/0004 |
| 10,672,552 B2* | 6/2020 | Chung | B32B 37/00 |
| 2017/0361369 A1* | 12/2017 | Horii | H02K 15/02 |

FOREIGN PATENT DOCUMENTS

| | | |
|---|---|---|
| JP | 2010-274625 A | 12/2010 |
| JP | 2011-020132 A | 2/2011 |
| JP | 5323400 B2 | 10/2013 |
| KR | 10-1996-0003021 A | 1/1996 |
| KR | 10-0119014 B1 | 9/1997 |
| KR | 10-2008-0067426 A | 7/2008 |
| KR | 10-2008-0067428 A | 7/2008 |
| KR | 10-1566492 B1 | 11/2015 |
| KR | 10-2016-0028678 A | 3/2016 |
| KR | 10-1599291 B1 | 3/2016 |

* cited by examiner (a)

(b)

(a)

(b)

(a)

(b)

ADHESIVE LAMINATE CORE MANUFACTURING APPARATUS AND CORE LAMINATOR THEREFOR

CROSS-REFERENCE TO RELATED APPLICATIONS

This application is the National Stage filing under 35 U.S.C. 371 of International Application No. PCT/KR2016/006406, filed on Jun. 16, 2016, which claims the benefit of Korean Patent Application No. 10-2016-0032876, filed on Mar. 18, 2016, the contents of which are all hereby incorporated by reference herein in their entirety.

TECHNICAL FIELD

The present invention relates to a core manufacturing apparatus for manufacturing a core of a motor or a generator and, more particularly, to an adhesive laminate core manufacturing apparatus and a core laminator for manufacturing a laminate core by interlayer adhesion between laminar members (thin sheets) for the core.

BACKGROUND ART

In general, a laminate core manufactured by laminating laminar members, e.g. thin metal sheets, in multiple layers and integrating the same is used as a rotor or a stator of a generator or a motor. As methods of manufacturing the laminate core, i.e., by laminating the laminar members and then integrally fixing the laminar members, a tap fixing method using interlock taps, a fixing method using welding, for example, laser welding, a rivet fixing method, etc. have been known. The laminate core forms at least a portion of a core for the rotor or a core for the stator The tap fixing method is disclosed as manufacturing technology of a laminate core in Patent Documents, i.e., Korean Patent Laid-open Publication Nos. 10-2008-0067426 and 10-2008-0067428. In manufacture of the laminate core using such a method, iron loss occurs, particularly, it is difficult to execute embossing due to thickness reduction in a material, i.e., a steel sheet, and thus it is limited as technology for manufacturing the laminate core. The above-described Patent Documents and Patent Documents which will be described later disclose various kinds and shapes of laminate core.

Recently, an adhesion fixing method, in which laminar members, each forming a unit thin sheet of a laminate core, are adhered to each other by an adhesive so as to be integrated, has been proposed. Such an adhesion fixing method is disclosed in Korean Patent Laid-open Publication No. 10-1996-0003021 and Japanese Patent Laid-open Publication No. H5-304037.

With reference to Japanese Patent Laid-open Publication No. H5-304037 among the above-described Patent Documents, a material for manufacturing a motor core, i.e., a steel sheet, is fed to a first press die and a second press die by a feed roller and, before the steel sheet is supplied to the first press die, an adhesive is applied to the surface of the steel sheet by an application roller and a nozzle.

Further, blanked members (laminar members) sequentially accumulated in the first press die and the second press die due to blanking of the material are integrated by the adhesive, thereby manufacturing an adhesive laminate core. The above-described adhesion fixing methods, i.e., the adhesive laminate core manufacturing method, may reduce manufacturing costs, as compared to the laser welding method, and correspond to thickness reduction in the steel sheet.

DISCLOSURE

Technical Problem

It is an object of the present invention to provide a core laminator and an adhesive laminate core manufacturing apparatus having the same for manufacturing a laminate core by integrating the laminar members.

Technical Solution

In accordance with an aspect of the present invention, there is provided a core laminator of an adhesive laminate core manufacturing apparatus for integrating laminar members to pass therethrough, thereby forming laminate cores. The core laminator comprises a heating unit heating adhesive interposed between the laminar members, so as to integrate the laminar members in a plurality of sheets into one body and form the laminate core, a pinch unit having a hollow shape, rotatably provided at lower side of the heating unit, and applying lateral pressure to the laminate core for preventing the laminate core from falling rapidly, a squeeze unit including a cylinder rotatably provided at upper side of the heating unit, and a squeezer having a hollow shape and fixed in the cylinder, the squeezer coaxially aligning the laminar members in a straight line from above the heating unit, a guide for guiding movement of the laminar members within the heating unit, provided in the heating unit and rotated by the pinch unit and squeeze unit, and a driving unit for rotation connected to the pinch unit and the squeeze unit, so as to selectively rotate the pinch unit and the squeeze unit simultaneously at the same angle.

The squeeze unit applies lateral pressure to the laminar members and squeezes the laminar members, so that the laminar members pass through inside of the squeezer in the state of interference fit into the squeezer.

The core laminator may further comprise a cooling system provided at a lower press die, wherein the lower press die supports the heating unit, the pinch unit, and the squeeze unit.

The squeezer is fixed at inside of the cylinder, and moves integrally with the cylinder. And, the squeezer may include a squeeze ring having a hollow shape passed through in the vertical direction and fixed in the cylinder, and an outer circumferential surface of the squeeze ring is in close contact with an inner circumferential surface of the cylinder.

The squeeze unit may further include a cooling path which guides spiral flow of cooling fluid at the interface between the cylinder and the squeeze ring. The cooling path is connected with the cooling system and guides the flow of the cooling fluid from inflow portion of the cooling path to a discharge portion of the cooling path formed at the interface between the cylinder and the squeeze ring.

The cooling path may include a spiral cooling groove which is formed at the outer circumferential surface of the squeeze ring, the spiral cooling groove being formed in the spiral direction from an upper end of the squeeze ring to a lower end of the squeeze ring, and the spiral cooling groove connects the inflow portion and the discharge portion of the cooling path.

The cylinder may include an intake groove formed in annular shape at the outer circumferential surface of the cylinder, so as to supply the cooling fluid, a discharge groove formed in annular shape at the outer circumferential surface of the cylinder, so as to discharge the cooling fluid, a fluid supply hole formed at the intake groove, penetrating the cylinder, and connected to the inflow portion of the cooling path, and a fluid discharge hole formed at the discharge groove, penetrating the cylinder, and connected to the discharge portion of the cooling path.

The inflow portion and the discharge portion of the cooling path are spaced apart from each other, the inflow portion and the discharge portion being formed in annular shape at the interface between the cylinder and the squeeze ring.

A blanking die is fixed on an upper end of the cylinder and moves integrally with the cylinder. Any one of the fluid supply hole and a fluid discharge hole is connect to an exposed flow path formed at the upper end of the cylinder, so that the cooling fluid under flowing comes into contact with lower surface of the blanking die, and the exposed flow path is covered by the blanking die.

The lower end of the cylinder is mounted on an upper end of the guide, and the lower end of the guide is mounted on the pinch unit.

The cooling system may include a first cooling part supporting rotation of the cylinder and cooling the squeeze unit and supporting rotation of the cylinder, a second cooling part surrounding the heating unit, and a third cooling part surrounding the pinch unit and supporting the rotation of the pinch unit.

Each of the first cooling part, second cooling part, and the third cooling part may have a cooling path which guides flow of cooling fluid. The second cooling part includes a fixing block which has a receiving part for containing the heating unit and covers an upper side and a circumference of the heating unit. And the second cooling part may be provided with the cooling path.

The driving unit may include a first pulley provided at the cylinder, a second pulley fixed at the pinch unit, and a driving pulley connected to the first pulley and the second pulley, so as to simultaneously transmit driving force to the first pulley and the second pulley.

In accordance with another aspect of the present invention, there is provided an adhesive laminate core manufacturing apparatus comprising: a blanking unit for blanking a material which is continuously transferred, and sequentially forming laminar members so as to manufacture a laminate core; and the core laminator provided at a lower press die, for integrating laminar members to pass therethrough, thereby forming laminate cores.

Advantageous Effects

A core laminator and an adhesive laminate core manufacturing apparatus in accordance with the present invention have the effects described below.

First, in accordance with the embodiment of the present invention, a part in which laminar members are aligned and laminated, a part in which the laminar members are integrated by heat (adhesive hardening part), and a part from which a laminate core is discharged are precisely interlocked with one another so as to be rotated integrally with each other, thus minimizing variation in the thickness of a laminate core and enabling the manufacture of laminate cores based on index process or skew process with high precision.

Second, in accordance with the embodiment of the present invention, precision of the part in which laminar members are aligned and laminated, i.e. precision of a squeeze unit is maintained stably, thus preventing errors of lamination and production Third, in accordance with the embodiment of the present invention, a guide forming a path of product within the adhesive hardening part in which the laminar members are integrated precision is driven by the squeeze unit and the pinch unit and rotates simultaneously together with the squeeze unit and the pinch unit, thus preventing distortion of the laminar members during core forming process.

Fourth, in accordance with the embodiment of the present invention, laminate cores may be continuously manufactured by using a strip-type material including an adhesive layer applied or coated on the surface thereof and integrating laminar members in a predetermined number of sheets into one body by interlayer adhesion between the laminar members.

Fifth, in accordance with the embodiment of the present invention, a interlayer division unit selectively synchronized with a process of blanking the strip-type material can divide the laminar members by a predetermined number of sheets, thus facilitating the manufacture and interlayer division of laminate cores.

DESCRIPTION OF DRAWINGS

The above and other objects, features and other advantages of the present invention will be more clearly understood from the following detailed description taken in conjunction with the accompanying drawings, in which.

BEST MODE

Figure 1:
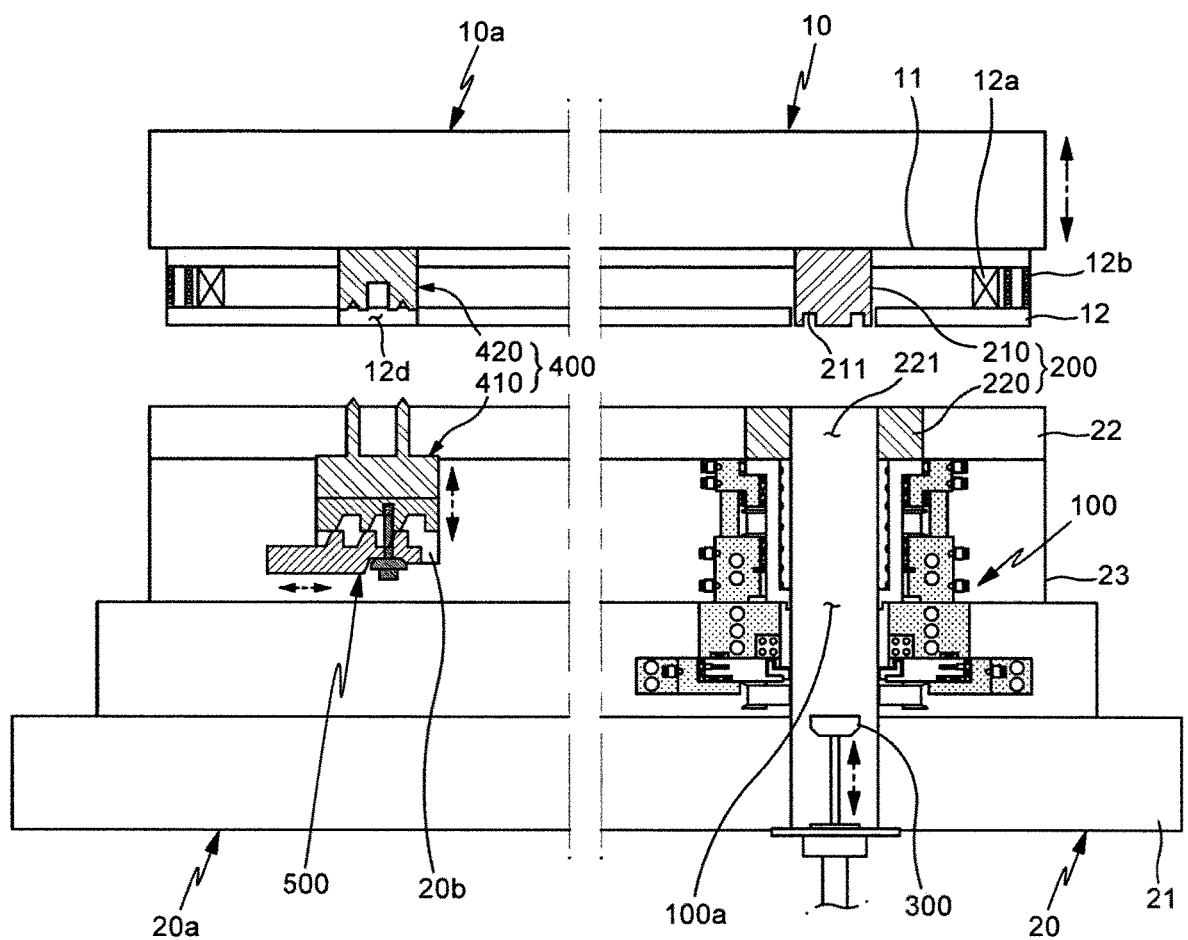
FIG. 1 is a longitudinal-sectional view schematically illustrating an adhesive laminate core manufacturing apparatus in accordance with one embodiment of the present invention, taken in the transfer direction of a material.

Hereinafter, preferred exemplary embodiments of the present invention by which objects of the present invention can be specifically implemented will be described with reference to the accompanying drawings. In the description of the present exemplary embodiments, the same terms and the same reference numerals are used to describe the same configurations, and additional descriptions thereof will be omitted.

The embodiments of the present invention are a core laminator and an adhesive laminate core manufacturing apparatus having the same which may integrate laminar members into one body in a predetermined number by means of interlayer adhesion and form laminate cores. The adhesive laminate core manufacturing apparatus according to the embodiments of the present invention relate to an adhesive laminate core manufacturing apparatus that manufactures a core of a motor, a generator, etc. by forming laminar members having a predetermined shape by blanking a strip-type material, which is continuously transferred by a predetermined distance, for example, 1 pitch, at each cycle and executing interlayer adhesion between the laminar members so as to integrate the laminar members.

In other words, the core laminator is a lamination device which integrates laminar members formed by blanking into one body by means of interlayer adhesion and thus forms adhesive type laminate cores. And the adhesive laminate core manufacturing apparatus according to the embodiments of the present invention is core manufacturing apparatus which includes a blanking unit for blanking and the core laminator.

More particularly, the embodiments of the present invention relate to apparatus integrating the laminar members with the adhesive interposed between the laminar members and forming a laminated type core, i.e. a laminate core. For example, the embodiments of the present invention relate to a core laminator and an adhesive laminate core manufacturing apparatus that is capable of manufacturing the aforementioned core, i.e. a laminate core, using a strip-type material including an adhesive layer applied on the surface thereof (a steel sheet including an adhesive layer applied on the surface thereof for manufacturing a core), or capable of applying adhesive on a strip-type steel sheet without adhesive on the surface thereof and forming the laminate core. The laminate core forms at least one portion of a core for a stator or a rotor.

First, with reference to FIGS. 1 to 6, a core laminator and an adhesive laminate core manufacturing apparatus in accordance with one embodiment (a first embodiment) of the present invention will be described. The adhesive laminate core manufacturing apparatus in accordance with one embodiment of the present invention is based on a press system that is capable of sequentially forming laminar members L having a predetermined shape using a strip-type material S which is passed through the press system, and sequentially manufacturing laminate cores C including the laminar members, which are integrated in a predetermined number into one body by interlayer adhesion between the laminar members.

With reference to FIGS. 1 to 7, one embodiment of the core laminator forms laminate cores by integrating the laminar members into one body by interlayer adhesion between the laminar members. The adhesive laminate core manufacturing apparatus (hereinafter, referred to as a 'core manufacturing apparatus') includes a core laminator 100 and a blanking unit 200.

The blanking unit 200 sequentially forms the laminar members L by blanking the material S, i.e. a steel strap for manufacturing the core of the motor which is continuously transferred, and sequentially supplies the laminar members L to the core laminator 200.

The core laminator 100 integrates the laminar members L sequentially formed by the blanking unit 200 and passing through the core laminator 100. More particularly, the core laminator 100 integrates the laminar members L in a predetermined number into one body by heating the adhesive interposed between the laminar members L.

The core laminator 100 includes a heating unit 110, a pinch unit 120, a squeeze unit 130, a guide 140, and a driving unit 150 for rotation.

The heating unit 110 is an element having hollow shape, which integrates the laminar members L in plural sheets into one body by heating the adhesive interposed between the laminar members L for forming the laminate core.

The pinch unit 120 is rotatably provided under the heating unit 110. The pinch unit 120 is an element having hollow shape which provides lateral pressure to the laminate core C so as to prevent the laminate core C from falling. Therefore, the pinch unit 120 pinches the laminate core member C under the heating unit 110.

The squeeze unit 130 is an element having hollow shape, which includes a cylinder 131 rotatably provided above the heating unit 110, and a squeezer 132 having hollow shape and fixed in the cylinder 131.

The squeezer 132 coaxially aligns the laminar members L in a straight line from above the heating unit 110 so that the laminar members L are coaxially stacked inside the squeeze unit 130. In more detail, the squeezer 132 applies lateral pressure to the laminar members L moving toward the heating unit 110.

In other words, the squeezer 132 squeezes the circumferences of the laminar members L for coaxially aligning the laminar members in a straight line so that the laminar members L pass through the squeezer 132 in the state in which the laminar members L are interference-fitted into the squeezer 132. In this embodiment, the laminar members L are pushed downwards by the blanking unit 200 and pass through the inside of the core laminator 100 (laminating hole; 100*a*) by 1 step (equivalent to the thickness of a single laminar member). The squeezer 132, the guide 140, and the Pinch unit 120 form the laminating hole 100*a*.

The guide 140 is provided in the heating unit 110 and guides movement of the laminar members L. And the guide 140 is driven and rotated by the pinch unit 120 and squeeze unit 130.

The driving unit 150 is connected to the pinch unit 120 and the squeeze unit 130 so as to rotate the pinch unit 120 and the squeeze unit 130 simultaneously at the same angle as each other.

A cooling system 160 is provided at a lower press die 20 at which the core laminator 100 is provided. The lower press die 20 supports the heating unit 110, the pinching unit 120, and the squeeze unit 130.

The cooling system 160 may include a first cooling part 160A for cooling the squeeze unit 130 and supporting rotation of the cylinder 131, a second cooling part 160B surrounding the heating unit 110, and a third cooling part 160C surrounding the pinch unit 120 and supporting the rotation of the pinch unit 120.

The squeezer 132 is fixed in the cylinder 131 and moves integrally with the cylinder 131. For example, the squeezer 132 may include a squeeze ring formed in the shape of a ring that is completely hollow in the vertical direction and fixed in the cylinder 131. The outer circumferential surface of the squeezer 132 is in surface contact with the inner circumferential surface of the cylinder 131 so that the squeezer 132 is interference-fitted into the cylinder 131. However, the fixing method of the squeezer 132 is not limited thereto.

Hereinafter, with reference to the attached drawings, the core laminator 100 in accordance with this embodiment will be described in more detail.

The inner space of the core laminator 100, i.e. the laminating hole 100*a* is a space in which the laminar members L are laminated in the vertical direction and continuously move so as to be integrated, and in this embodiment, the laminating hole 100*a* is formed through the core laminator 100 in the vertical direction.

The heating unit 110 is a device that heats the adhesive interposed between the laminar members L, in this embodiment, the heating unit 110 includes a high-frequency induction heater for hardening the adhesive by way of high-frequency induction heating and integrating the objects to be heated, i.e. the laminar members L. High-frequency induction heating is well known in the art, and a detailed description thereof will thus be omitted. In the present invention, high-frequency induction heating is disclosed as a method of effectively heating the adhesive interposed between the laminar members and minimizing thermal influence on peripheral parts.

The heating unit 110 has a hollow shape. The heating unit 110 has therein a hardening hole, through which the laminar members pass and which forms a hardening space of the adhesive, and the guide 140 for guiding movement of the laminar members L is provided in the hardening hole. The guide 140 may be formed of a nonconductive material, in greater detail, of an engineering ceramic, so as not to be influenced by high-frequency induction heating.

The guide 140 may have a vacant integral block structure, such as a ring type or a barrel type, or may have a split structure in which a plurality of parts is mounted so as to be spaced apart from each other within the heater. In consideration of thermal expansion and smooth rotation of the objects to be heated (the laminar members) and the guide 140, a gap may be formed between the inner circumferential surface of the heating unit 110 and the guide 140.

The pinch unit 120 prevents a product discharged downwards from the heating unit 110, i.e. the laminate core C formed by integrating the laminar members L, from falling rapidly, while or after laminar members L pass through the heating unit 110. To this end, the pinchers 320 are provided under the heater 310, and provide lateral pressure to the laminate core C so as to prevent the laminate core C from falling rapidly.

The squeeze unit 130, i.e. the squeezer 132 applies pressure (lateral pressure) to the side surfaces of the laminar members L moving downwards toward the heating unit 110 from above the heating unit 110 so as to squeeze the laminar members L and induces the laminar members L to align and stack in a straight line.

More particularly, the squeezer 132 applies lateral pressure to the laminar members L so that the laminar members L sequentially formed by blanking the material S are aligned so as to be laminated within the entrance of the laminating hole 100*a*, i.e. the space above the heater 310. As the laminar members L sequentially enter the squeezer 132, the laminar members L are interference-fitted into the squeezer 132 and thereby laminated in the squeezer 132. In other words, the squeezer 132 squeezes the circumferences of the laminar members L so that the laminar members introduced into the laminating hole 100*a* are coaxially aligned in a straight line within the entrance of the laminating hole.

In this embodiment, the squeezer 132 is located above the heating unit 110 and aligns the laminar members L beforehand, in a straight line. And, the laminar members L are laminated in the aligned state by the squeezer 132 and enter the high-frequency induction heater, i.e. the heating unit 110, via the squeezer 132. The squeezer 132 may be made of special steel, for example, SKD-11.

The blanking unit 200 sequentially forms the laminar members L by blanking the material, thereby sequentially supplying the laminar members L to the core laminator 100, especially to the squeezer 132 in order to laminate the laminar members L in the core laminator 100.

In this embodiment, the blanking unit 200 includes a blanking punch 210 provided at the upper press die 10 and a blanking die 220 provided at the lower press die 20. The blanking unit 200 forms laminar member L having a predetermined shape by blanking a strip-type material S, which is continuously, transferred by 1 pitch between the blanking punch 210 and the blanking die 220.

The laminar member L is a thin sheet having a single layer, which is formed by blanking the material S, and the laminate core C forms at least one portion of a stator or a rotor for a device such as a motor or a generator.

The blanking punch 210 is provided at the upper press die 10 which faces the lower press die 20 and is capable of being raised and lowered, particularly at an upper frame 11. The blanking die 220 has therein a blanking hole 221 that faces the blanking punch 210.

In this embodiment, the blanking die 220 is provided at the lower press die 20, particularly a die frame 22. The shape of the laminar member depends on the shape of the blanking die 220, particularly the blanking hole 221.

The blanking punch 210 is raised and lowered once by the upper press die 10 whenever the material S moves 1 pitch. In other words, the material S passes through the space between the upper press die 10 and the lower press die 20 by 1 pitch for every stroke of the press, i.e. every stroke of the blanking punch 210, and the protrusion-forming process is executed at a predetermined timing before the blanking process.

The squeezer 132 is disposed under the blanking die 220 and is aligned coaxially therewith. And the heating unit 110 is disposed under the squeezer 132.

Figure 2:
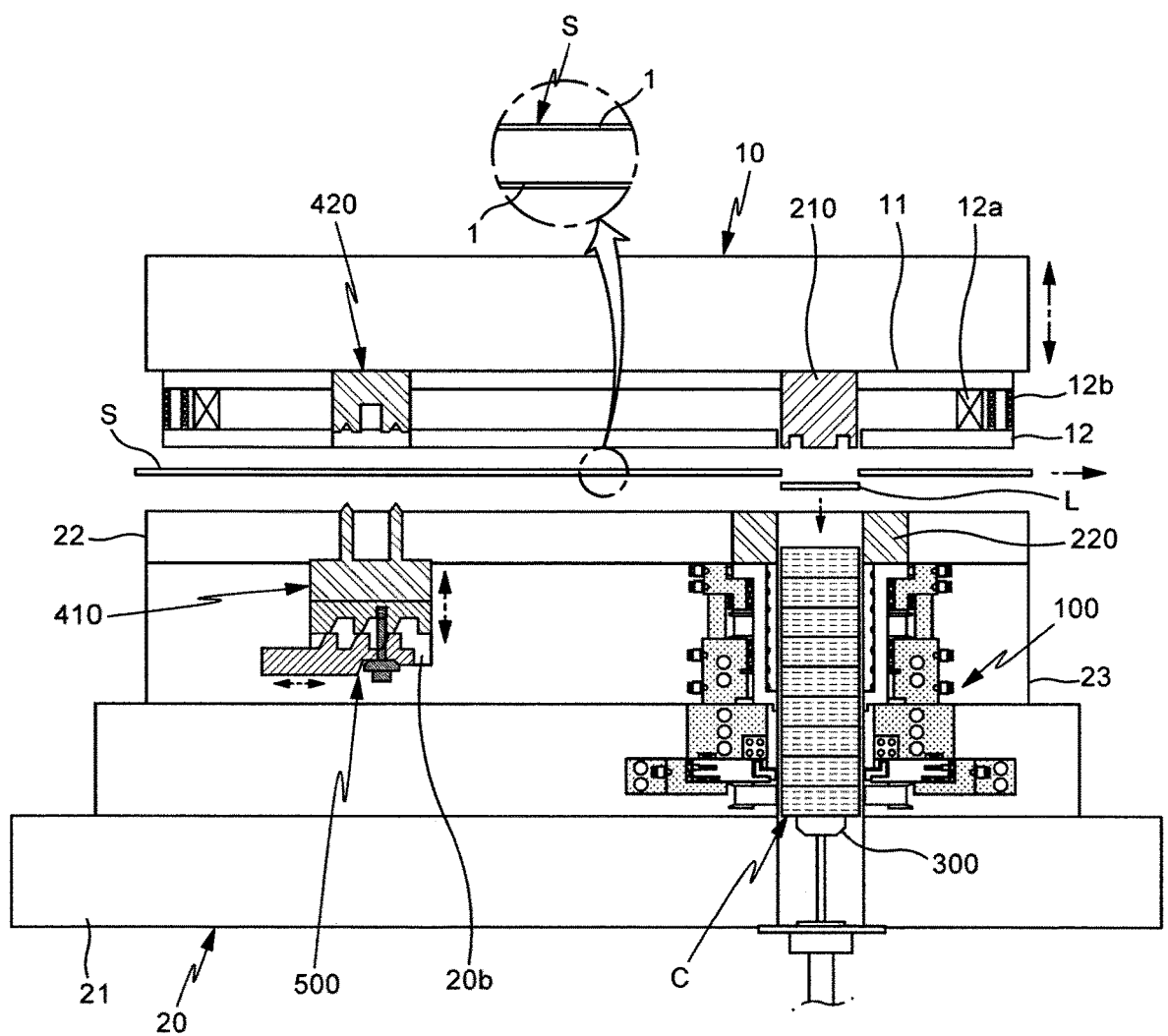
FIG. 2 is a view illustrating the state in which a material is supplied to the adhesive laminate core manufacturing apparatus in accordance with another embodiment of the present invention.
Figure 3:
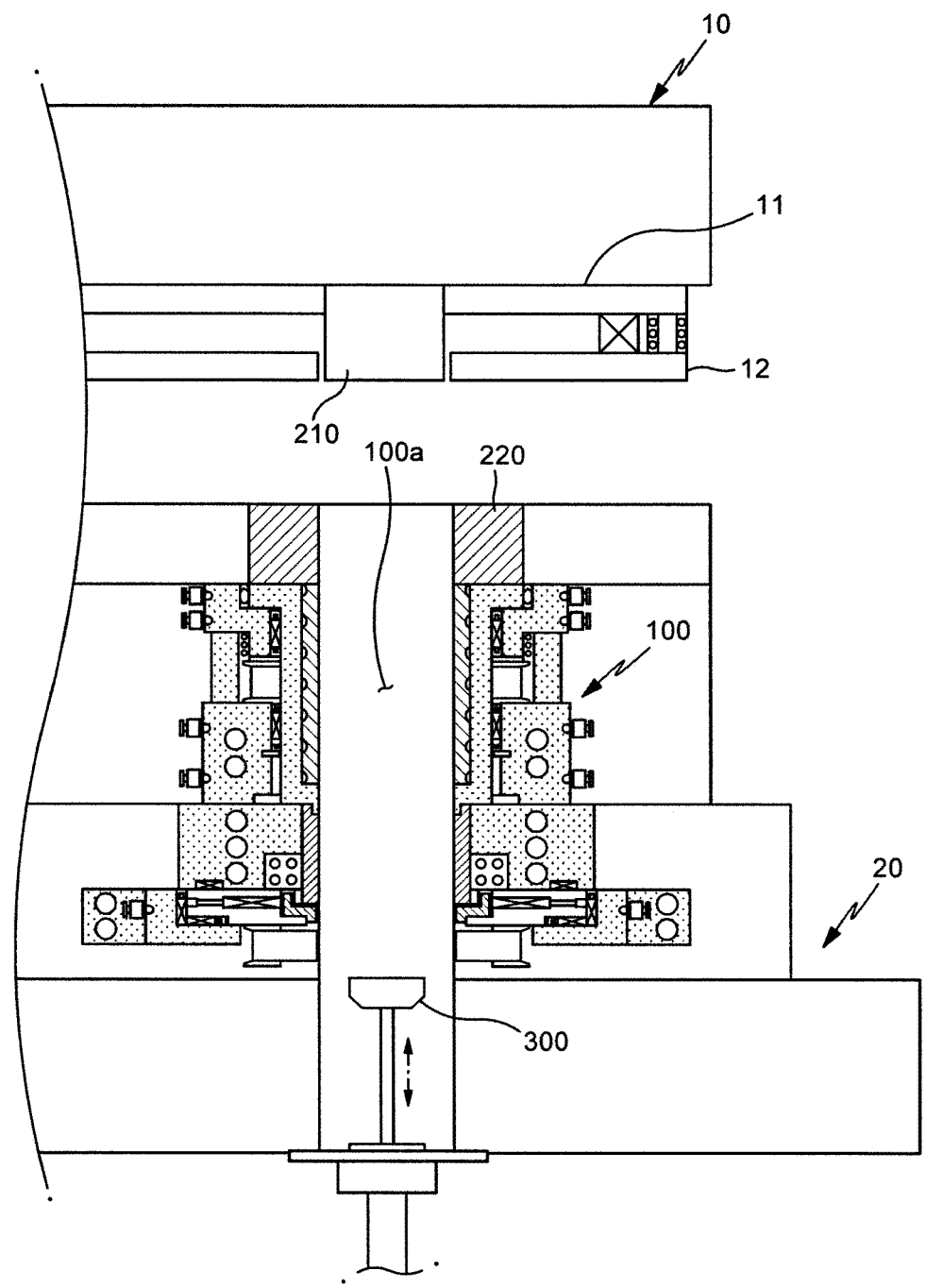
FIG. 3 is a longitudinal-sectional view illustrating a blanking unit and a core laminator of the adhesive laminate core manufacturing apparatus shown in FIGS. 1 and 2.
Figure 4:
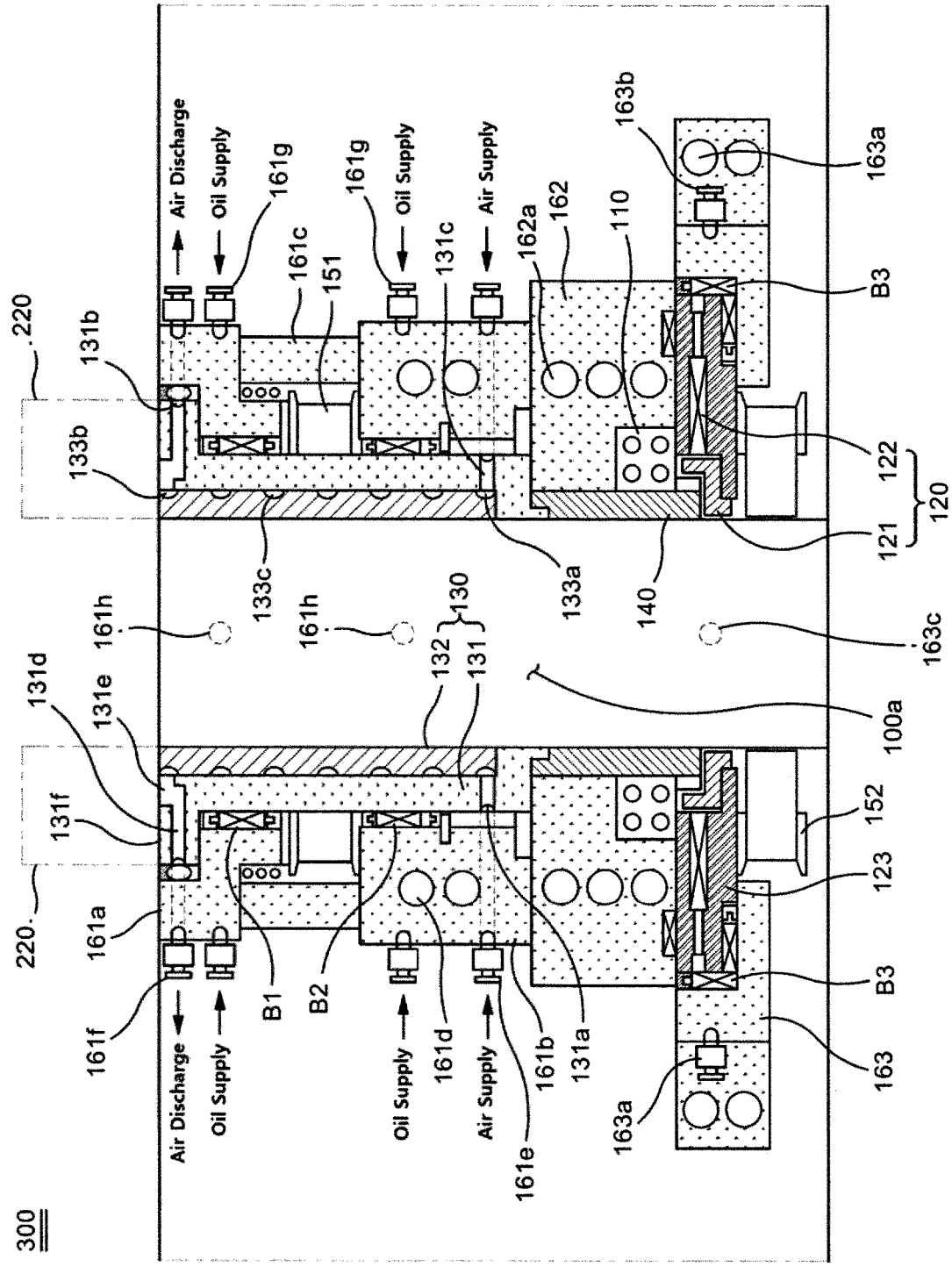
FIG. 4 is a cross-sectional view schematically illustrating the core laminator shown in FIG. 3.
Figure 5:
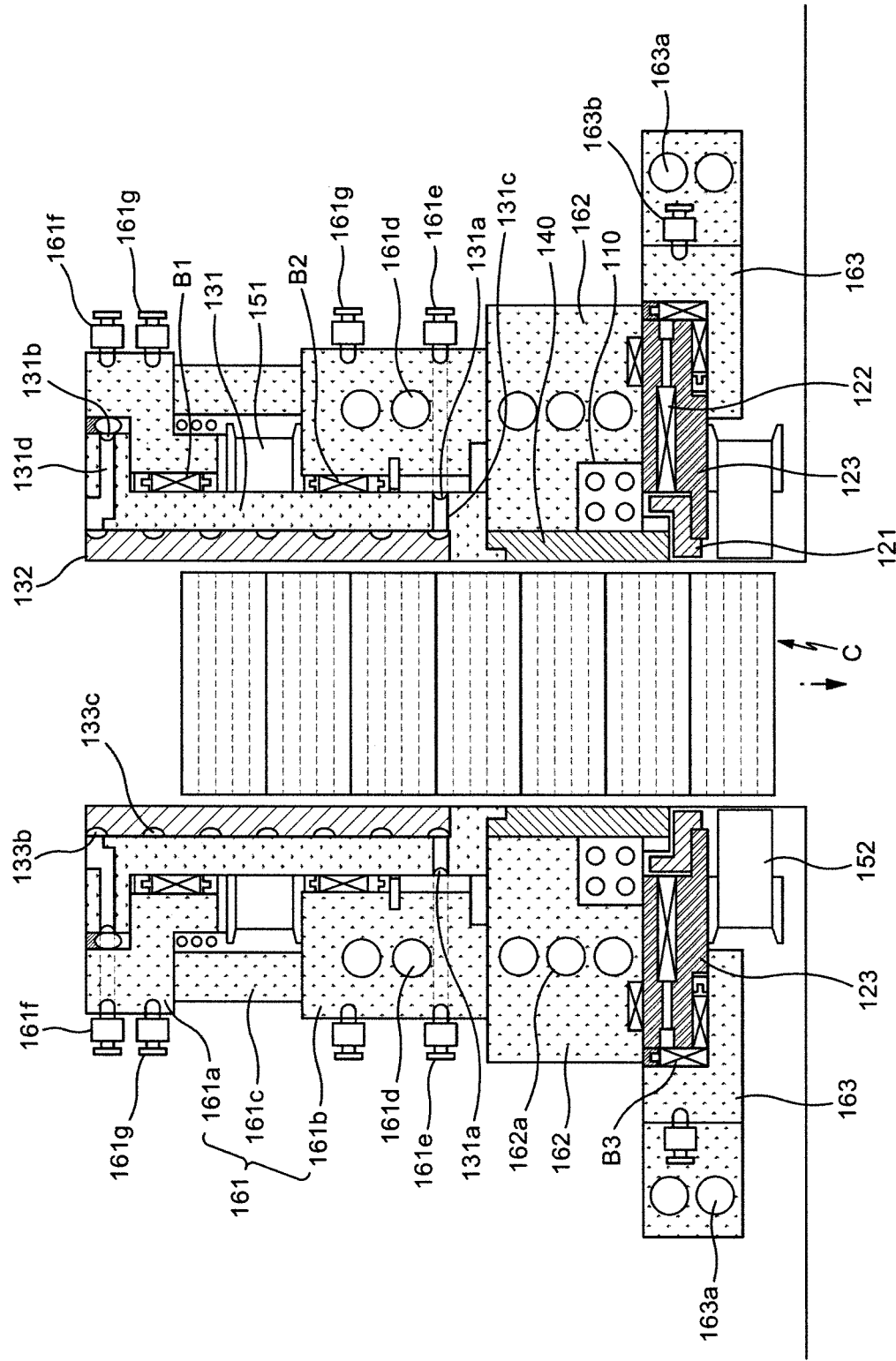
FIG. 5 is a cross-sectional view illustrating the process in which laminar members are integrated in a laminating hole of the core laminator shown in FIG. 4.

Although the laminar member L is illustrated as being smaller than the squeezer 132 and the blanking die 220 in FIGS. 2 and 5, it will be obvious to those skilled in the art that the two diameters are substantially the same as each other. The laminar member is formed to have a shape and a size equivalent to the shape and the size of the blanking die 220, particularly the shape and the size of the blanking hole, and the laminar members L pass through the laminating hole 100a from the top to the bottom thereof in the state in which the circumferences of the laminar members L are kept in close contact with the inner circumferential surface of the laminating hole 100a, particularly the inner circumferential surface of the squeezer 132. In the lamination structure of the laminar members shown in FIGS. 2 and 5, the dotted line represents a portion in which interlayer adhesion is executed, and the solid line represents a portion in which interlayer division is executed.

The squeezer 132 supports the side surfaces (for example, the circumferences) of the laminar members L and prevents a lamination error, i.e. an alignment error, of the laminar members L so as to sequentially stack the laminar members, and may include a squeezer ring that has the same shape as the inner hole in the blanking die 220, i.e. the blanking hole 221.

Figure 6:
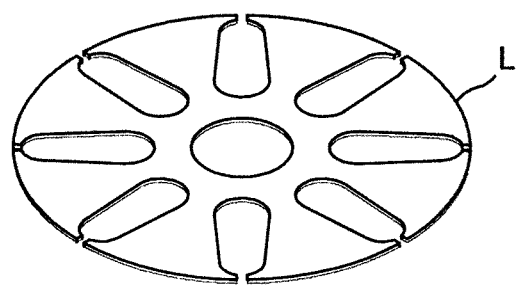
FIG. 6 is a perspective view illustrating an exemplary laminar member and an exemplary adhesive laminate core that can be manufactured by the present invention.
Figure 6:
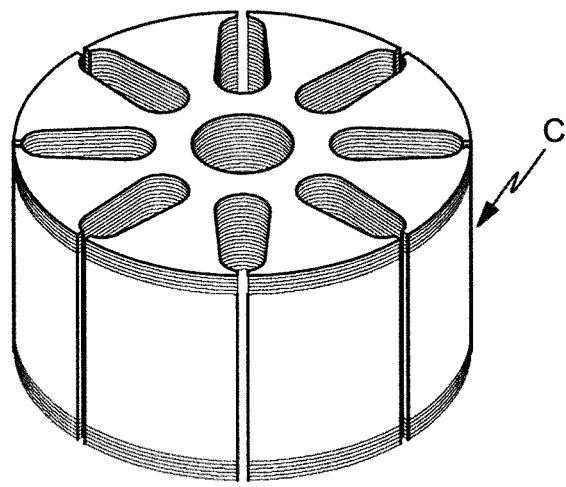
Figure 7:
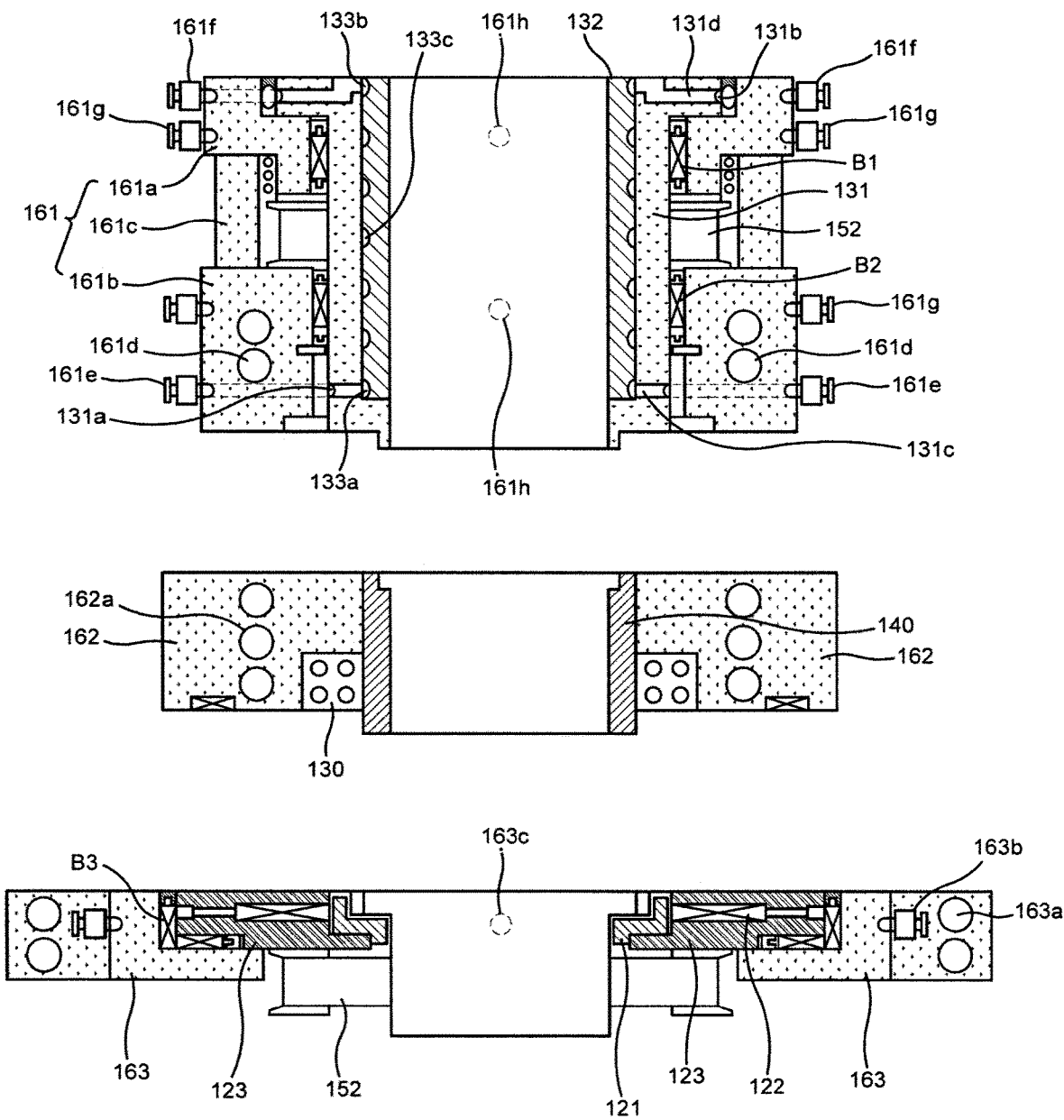
FIG. 7 is an exploded cross-sectional view illustrating the core laminator shown in FIG. 4.
Figure 8:
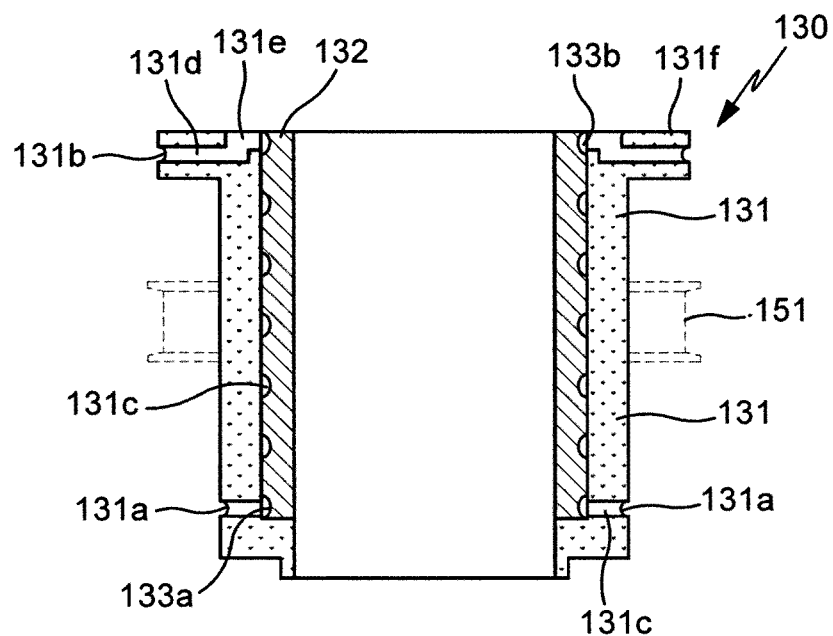
FIG. 8 is an exploded cross-sectional view illustrating a squeeze unit, a heating unit, and a pinch unit separated from one another for the core laminator shown in FIG. 7.
Figure 8:
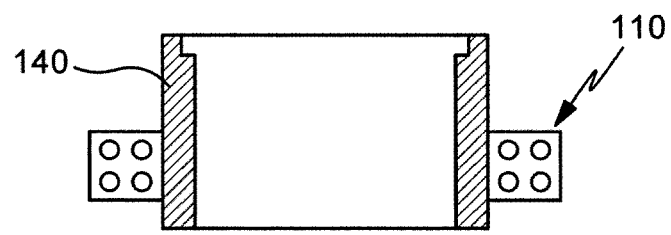
Figure 8:
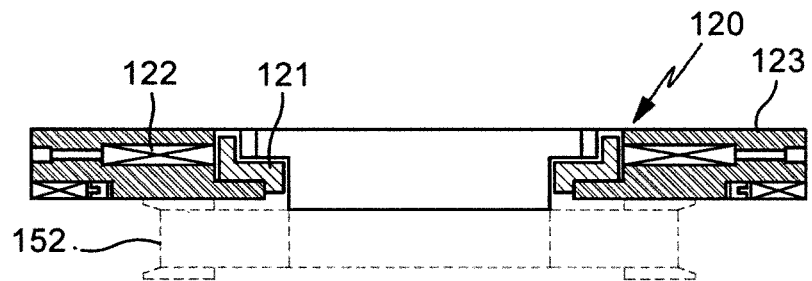
Figure 9:
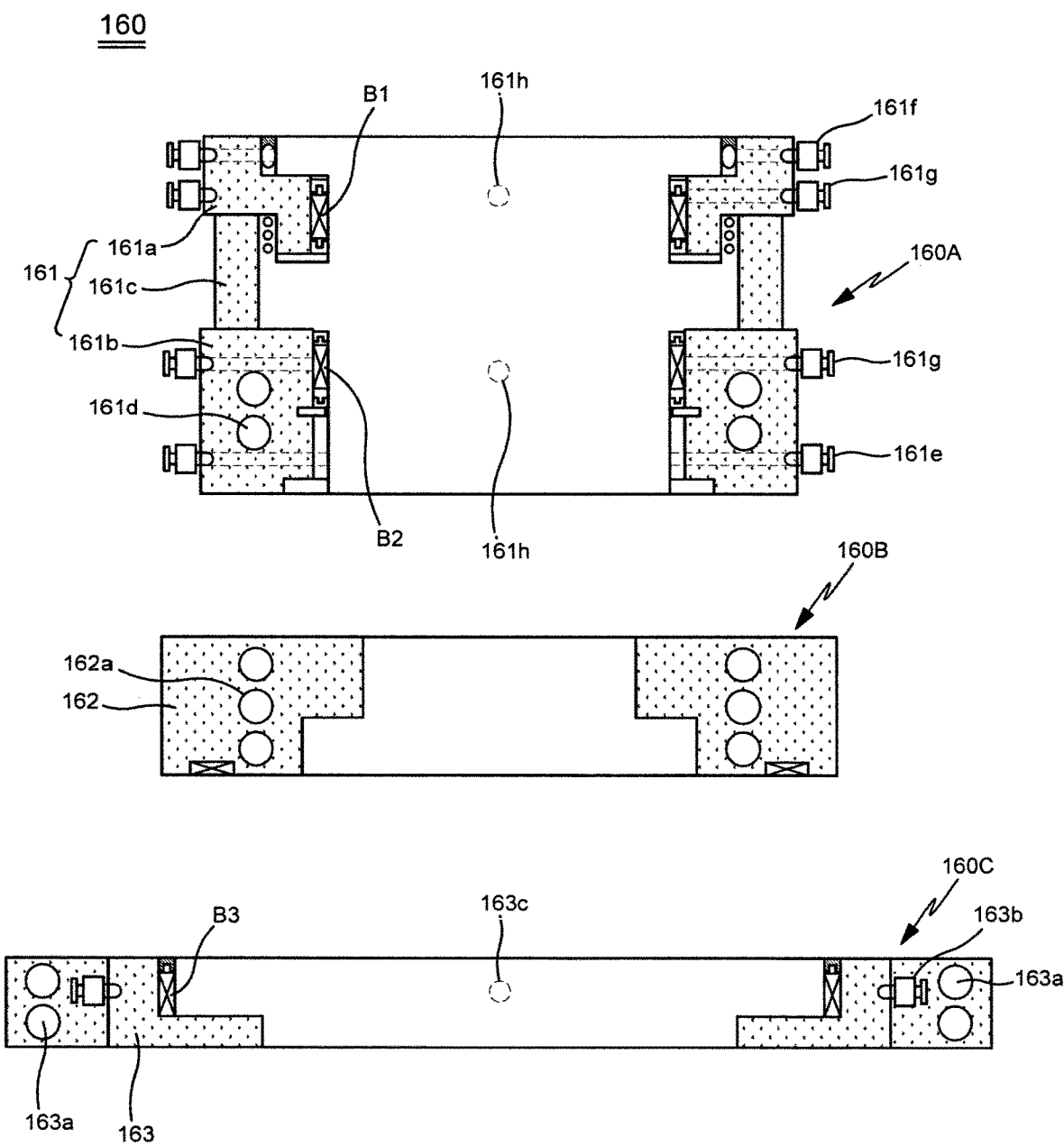
FIG. 9 is an exploded cross-sectional view illustrating a cooling system for the core laminator shown in FIG. 7.
Figure 10:
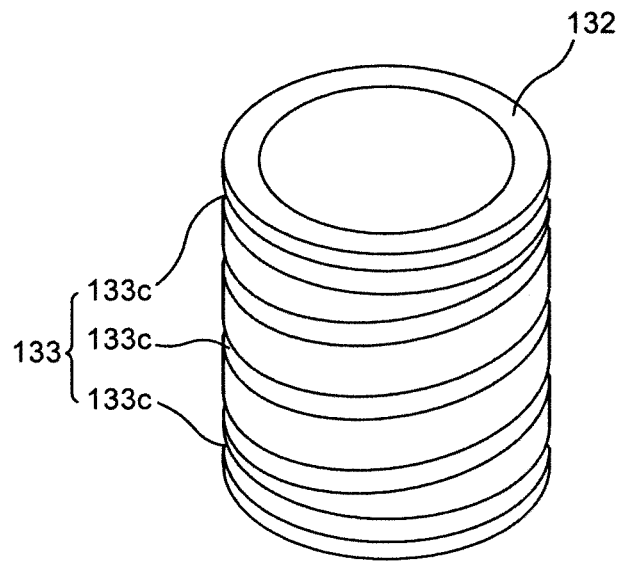
FIG. 10 is a view illustrating a squeezer of the squeeze unit shown in FIG. 4.
Figure 10:
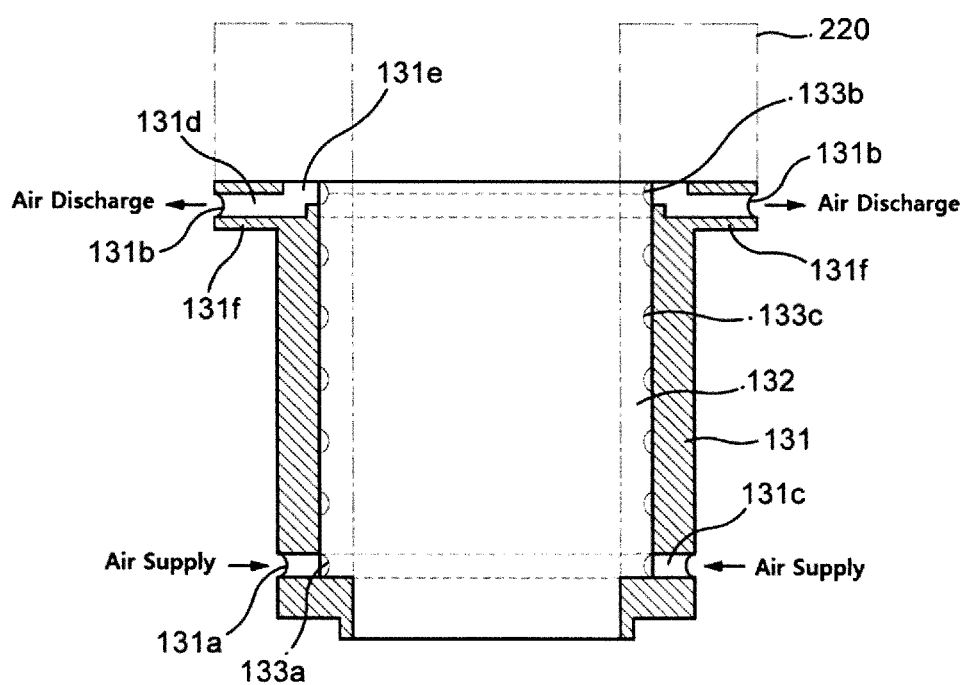
Figure 11:
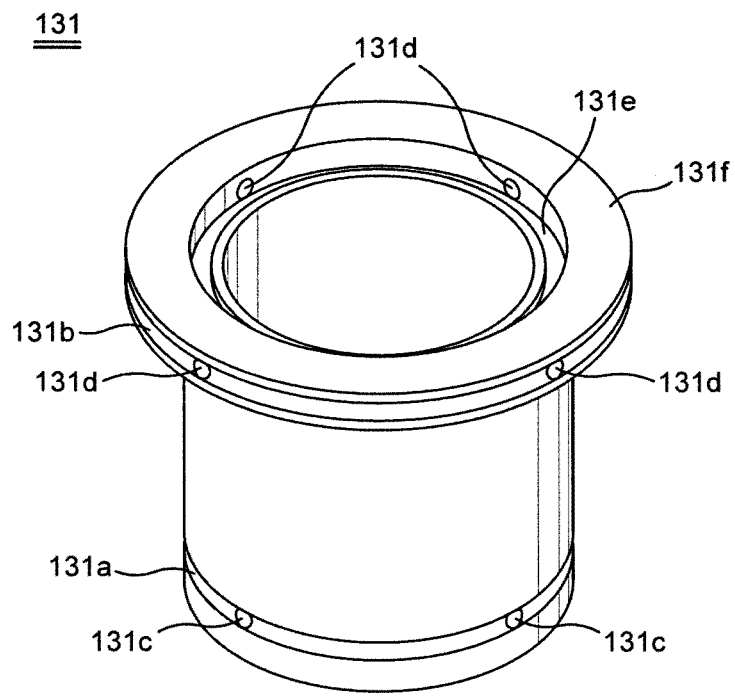
FIG. 11 is perspective views illustrating embodiments of a cylinder of the squeeze unit shown in FIG. 4.
Figure 11:
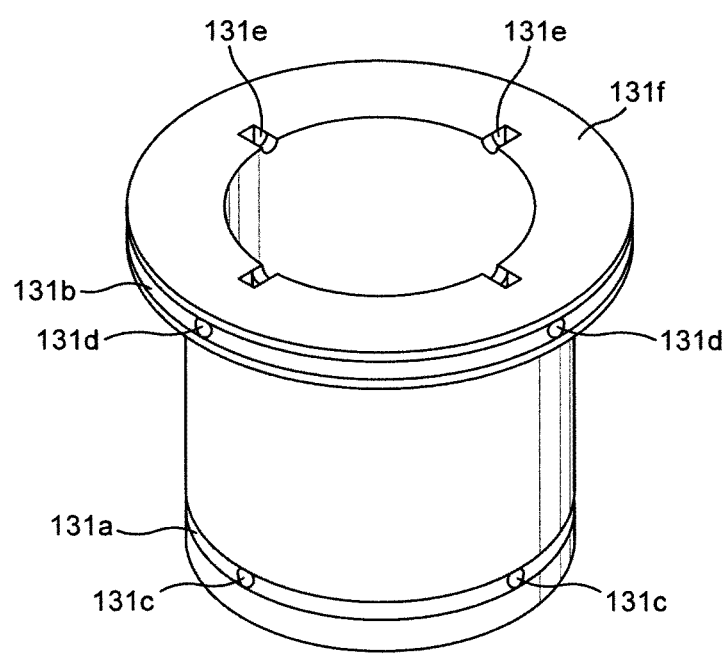

For example, in the case of manufacturing the laminate core shown in FIG. 6, the squeezer 132 may be formed in the shape of a cylinder that is completely hollow in the vertical direction. However, the shape of the squeezer for the present invention is not limited thereto.

As described above, the blanking unit 200 is a device that blanks the material, and the laminating unit 300 is a device that integrates the laminar members L sequentially formed through the blanking. The laminating hole 100a, in which the laminar members L sequentially laminated by the blanking unit 200 are integrated while passing therethrough, is provided under the blanking die 220 and is aligned coaxially therewith.

The pinch unit 120 applies lateral pressure to a product passing through the inner space of the pinch unit 120 and thus assists in alignment of the product moving downwards through the heating unit 110 and prevents the product, i.e. the laminate core C, from falling rapidly.

The pinch unit 120 includes a pinching block 121 and a pinch spring 122, which is an elastic member for elastically supporting the pinching block 121. The pinch unit 120 pinches the side surface of the laminate core C discharged from the heating unit 110 and prevents the laminate core C from falling rapidly to the bottom of the laminating hole 100a after passing through the heating unit 110.

Figure 12:
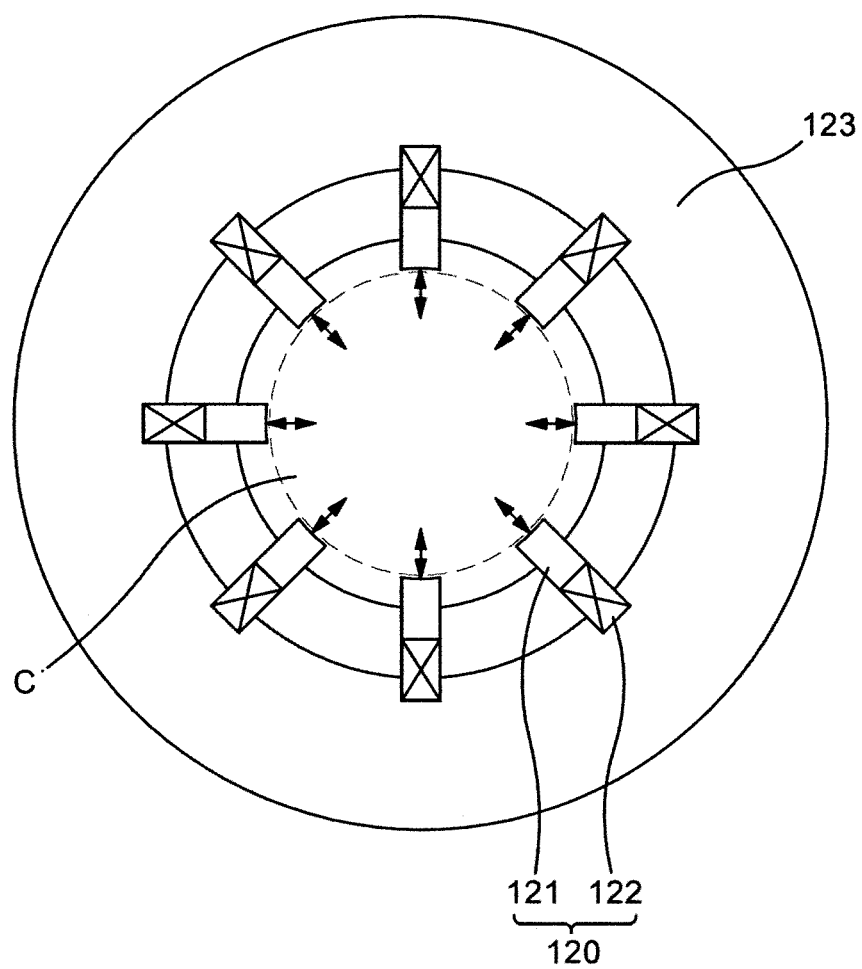
FIG. 12 is a plan view schematically illustrating one embodiment of the pinch unit shown in FIG. 4.

Referring to FIG. 12, a plurality of pinching blocks 121 are spaced apart from each other in a split manner along the circumference of the laminate core C within the laminating hole 100a, for example, are installed at predetermined angles at the laminating hole 100a. Although the pinch unit 120 may be formed as a moving type or a fixed type, the pinch unit 120 may be formed as a moving type in consideration of thermal expansion. If, in FIG. 12, the pinch springs 122 are omitted and the pinching blocks 121 are fixed in place, an example of the fixed-type pinchers may be formed.

The pinching blocks 121 are disposed at a plurality of positions spaced apart from each other along the circumference of the laminate core C and are elastically supported by elastic members, i.e. the pinch springs 122, thus applying elastic lateral pressure, i.e. pinching force, to the laminate core C.

The blanking die 220, the squeezer 132, the guide 140 and the pinch unit 120 are disposed in the lower press die 10 in the vertical direction so as to form the laminate hole 100a, and an extraction support 300 for supporting the bottom surface of a product (the laminate core C) discharged after undergoing the laminating and hardening processes is provided at the bottom of the laminating hole 100a so as to be elevatable (be capable of being raised and lowered).

The extraction support 100 descends in the state in which the lowest laminate core C within the laminating hole 100a is seated thereon. When the extraction support 100 reaches the bottom of the laminating hole, an extraction cylinder (not shown) pushes the laminate core C on the extraction support 100 to a product extraction passage and thus assists in extraction of the product. And then, the extraction support 100 rises for supporting other laminate core and repeats the process described above.

High-temperature heat is generated from the core laminator 100 by the heating unit 110. The lower press die 20, the blanking die 220 and the squeezer 132 may thermally expand due to the high-temperature heat generated by the heating unit 110, leading to variation in the shape or size of the laminar members L and consequent lamination error of the laminar members L.

This embodiment includes a cooling system 160 for the core laminator 100. The cooling system is provided at the lower press die 20, and includes the first cooling part 160A for cooling the squeeze unit 130 and supporting the rotation of the cylinder 131, the second cooling part 160B surrounding the heating unit 110, and the third cooling part 160C surrounding the pinch unit 120 and supporting the rotation of the pinch unit 120.

Referring to FIGS. 7 to 11, the squeezer 132 is provided in the cylinder 131, which is configured to be rotatable, and rotates integrally with the cylinder 131.

In this embodiment, the outer circumferential surface of the squeezer 132, i.e. the squeeze ring is in contact with inner circumferential surface of the cylinder 131, and a cooling path 133 is formed at the interface between the cylinder 131 and the squeezer 132.

The cooling path 133 of the squeeze unit 130 guides spiral flow of a cooling fluid (hereinafter, referred to as a 'first cooling fluid') at the interface between the cylinder 131 and the squeezer 132, i.e. squeeze ring. The cooling path 133 is connected with the cooling system 160, thereby guiding the flow of the first cooling fluid.

An inflow portion 133a and a discharge portion 133b of the cooling path 133 are spaced apart from each other at the cylinder 131 and the squeezer 132. The first cooling fluid flows spirally at the interface, thereby cooling the cylinder 131 and the squeezer 132.

The cooling path 133 includes a spiral cooling groove 133c is formed at the outer circumferential surface of the squeezer 132 and/or the inner circumferential surface of the cylinder 131 so as to connect the inflow portion 133a and the discharge portion 133b of the cooling path 133.

In this embodiment, the spiral cooling groove 133c is formed at the outer circumferential surface of the squeezer 132, connects the inflow portion 133a and the discharge portion 133b of the cooling path 133, and forms the spiral flow of the first cooling fluid. However, the invention is not limited thereto, and, as described above, the spiral cooling groove 133c may be formed at the inner circumferential surface of the cylinder 131.

The cooling fluid flows along the spiral cooling groove 133c and thus prevents overheating and thermal expansion of the squeezer 132, i.e. the squeeze ring.

Each of the inflow portion 133a and the discharge portion 133b of the cooling path 133 is formed in the outer circumferential surface of the squeezer 132 so as to form a closed loop in a circulating manner. More particularly, annular-shaped upper grooves are formed in the outer circumferential surface of the upper end portion and the outer circumferential surface of the lower end portion of the squeezer 132, respectively.

Any one of the annular-shaped upper grooves formed in the outer circumferential surface of the upper/lower end portions of the squeezer 132 may be the inflow portion 133a, and the other is the discharge portion 133b. In this embodiment, the inflow portion 133a is formed in the outer circumferential surface of the lower end portion of the squeezer 132, and the discharge portion 133b is formed in the outer circumferential surface of the upper end portion of the squeezer 132. However, this arrangement may be reversed. And Air is used as the cooling fluid. However, the example of the cooling fluid is not limited thereto.

The squeeze unit 130, the guide 140 and the pinch unit 120 of the core laminator 100 are rotatably provided at the lower press die 20 in order to realize a uniform thickness of the laminate core. The squeeze unit 130, the guide 140 and the pinch unit 120 are integrally rotated at a predetermined angle, for example, 120°, at a predetermined timing, thus reducing variation in the thickness of the laminate core C and improving the perpendicularity and flatness of the laminate core C.

In this embodiment, the squeezer 132 is fixed in the cylinder 131, and is rotatably supported by the first cooling part 160A, particularly an upper fixing block 161, which is fixed to the lower press die 20. The upper fixing block 161 is installed in the lower press die 20 in a fixed manner, and the cylinder 131 is rotatably provided in the upper fixing block 161.

The squeezer 132 is rotated with the cylinder 131, and upper bearings B1 and B2 are provided in the upper fixing block 161 in order to rotatably support the cylinder 131.

The upper fixing block 161 of this embodiment has a structure in which a plurality of bodies is assembled with each other in a stacked manner. However, the invention is not limited thereto. The cylinder 131 has a hollow cylindrical shape. The cylinder 131 includes an upper flange 131f, which protrudes from the upper end of the cylinder 131 in the outward direction of the cylinder 131, and the lower end of the cylinder 131 protrudes in the inward direction of the cylinder 131.

In more detail, the upper flange 131f is in surface contact with the bottom surface of the blanking die 220, and the lower end of the cylinder 131 surrounds the lower end of the squeezer 132. The squeezer 132 is press-fitted and fixed into the cylinder 131. And the blanking die 220 is fixed on the upper end of the cylinder 131 and is aligned coaxially therewith. Therefore, the blanking die 220 is rotated with the cylinder 131 and may be fixed to the cylinder 131 using a fastening member (not shown) such as a bolt.

The upper fixing block 161 includes an upper support body 161a for rotatably supporting the upper portion of the cylinder 131, a lower support body 161b for rotatably supporting the lower portion of the cylinder 131, and an intermediate support body 161c provided between the upper support body 161a and the lower support body 161b in order to support the weight of the upper support body 161a.

In this embodiment, the upper fixing block 161 is provided at the die holder 23, a first upper bearing B1 is provided between the inner surface of the upper support body 161a and the outer surface of the upper portion of the cylinder 131, and the second upper bearing B2 is provided between the inner surface of the lower support body 161b and the outer surface of the lower portion of the cylinder 131.

A gap formed between the upper flange 131f and the upper support body 161a is sealed so as to prevent leakage of the cooling fluid (air in this embodiment) in the squeezer 132.

The cooling system 160 further includes another cooling path for another cooling fluid (hereinafter 'second cooling fluid'). The first cooling fluid and the second cooling fluid may be same sort. However, the first cooling fluid and the second cooling fluid may be different from each other.

More particularly, a cooling path 161d for the second cooling fluid is formed at the first cooling part 161A. The cooling path 161d is provided at the upper fixing block 161 of the first cooling part 161A. In this embodiment, the cooling path 161d is formed in the lower support body 161b, and is of a water-cooling type that cools the upper fixing block 161 by circulating water. However, other kinds of cooling fluid, such as oil or air, may alternatively be used, and the cooling path may also be formed in the upper support body 161a and the intermediate support body 161c.

The upper fixing block 161 is provided with a fluid supply part 161e for supplying the first cooling fluid to the spiral cooling groove 133c formed in the squeezer and a fluid discharge part 161f for discharging the first cooling fluid from the spiral cooling groove 133c formed in the squeezer.

In this embodiment, the first cooling fluid is air, the fluid supply part 161e is an air supplying part, and the fluid discharge part 161f is an air discharging part.

In this embodiment, the air supplying part 161e is provided at the lower support body 161b and supplies air to the inflow portion 133a formed in the outer circumferential surface of the squeezer 132. The air discharging part 161f is provided at the upper support body 161a and discharges air from the upper portion of the squeezer 132.

In more detail, air for cooling, which is supplied to the lower groove, i.e. the inflow portion 133a formed on the squeezer 132, flows spirally along the spiral cooling groove 133c to the upper groove, i.e. the discharge portion 133b formed on the squeezer 132, and thus exchanges heat with the squeezer 132.

The cylinder 131 includes an intake groove 131a, a discharge groove 131b, a fluid supply hole 131c, and a fluid discharge hole 131d. And any one of the fluid supply hole 131c and a fluid discharge hole 131d is connect to an exposed flow path 131e so that the first cooling fluid, i.e. the cooling air while flowing comes into contact with lower surface of the blanking die 220. The exposed flow path 131e is covered by the blanking die 220.

The intake groove 131a for supplying the cooling fluid to inside of the cylinder 131 is formed in annular shape at the outer circumferential surface of the cylinder 131. And the discharge groove 131b is formed in annular shape at the outer circumferential surface of the cylinder 131.

The intake groove 131a and the discharge groove 131b are spaced apart from each other. The fluid supply hole 131c is formed at the intake groove 131a, penetrates the cylinder 131 and is connected to the inflow portion 133a of the cooling path. And the fluid discharge hole 131d is formed at the discharge groove 131b, penetrates the cylinder 131 and is connected to the discharge portion 133b of the cooling path.

In this embodiment, the intake groove 131a is formed in the outer circumferential surface of the lower portion of the cylinder 131 so as to form a closed loop in a circulating manner. The fluid supply hole 131c is formed at the intake groove 131a and penetrates the cylinder 131 so that air is introduced into the cylinder 131 therethrough. The fluid supply hole 131c communicates with the lower end portion of the spiral cooling groove 133c, particularly with the inflow portion 133a of the cooling path.

The discharge groove 131b is formed in the outer circumferential surface of the upper portion of the cylinder 131, particularly in the outer circumferential surface of the upper flange 131f, so as to form a closed loop in a circulating manner along the circumference of the cylinder 131. The fluid discharge hole 131d is formed at the discharge groove 131b and penetrates the cylinder 131. The fluid discharge hole 131d communicates with the upper end portion of the spiral cooling groove 133c, particularly with the discharge portion 133b of the cooling path.

According to this embodiment, the fluid supply hole 131c is connected to the lower groove formed on the squeezer 132, i.e. the inflow portion 133a, and the fluid discharge hole 131d is connected to the upper groove formed on the squeezer 132, i.e. the discharge portion 133b. However, the flow of the cooling fluid may has reverse direction that the cooling fluid is supplied to the upper portion of the cylinder 131 and discharges from the lower portion of the cylinder 131.

In this embodiment, the intake groove 131a is formed horizontally at the same height as the inflow portion 133a, the discharge groove 131b is formed horizontally at the same height as the discharge portion 133b, and the fluid supply hole 131c and the fluid discharge hole 131d horizontally penetrate the cylinder 131. A plurality of the fluid supply holes 131c and a plurality of the fluid discharge holes 131d may be formed at the cylinder 131.

As described above, since the annular-shaped intake groove 131a and the annular-shaped discharge groove 131b, each of which forms a closed loop, are respectively formed in the outer circumferential surface of the lower portion of the cylinder 131 and the outer circumferential surface of the upper portion thereof, even when the cylinder 131 rotates, the air supplying part 161e and the air discharging part 161f can be connected to the intake groove 131a and the discharge groove 131b at all times, thus stably realizing the supply and discharge of air.

In this embodiment, the lower support body 161b has therein an inlet hole, which penetrates the lower support body 161b in order to guide air from the air supplying part 161e to the intake groove 131a, and the upper support body 161a has therein an outlet hole, which penetrates the upper support body 161a in order to discharge air from the discharge groove 131b to the outside.

In order to allow air for cooling, which is discharged from the outer circumferential surface of the squeezer 132 to the outside of the cylinder 131 through the fluid discharge hole 131d, to directly contact the blanking die 220 and exchange heat therewith, the exposed flow path 131e is formed at the upper end of the cylinder 131. Therefore, while being discharged, air for cooling comes into contact with the blanking die 220 and exchanges heat therewith.

An upper portion of the exposed flow path 131e is open. More particularly, referring to (a) of FIG. 11, the exposed flow path 131e may be formed in annular shape at the upper end of the cylinder 131, i.e. the inner circumferential surface of the upper end of the cylinder 131. And the exposed flow path 131e may include a plurality of openings shown in (b) of FIG. 11, which are divided in the circumferential direction of the upper end of the cylinder 131.

Further, the upper fixing block 161 is provided with an oil supply unit 161g for supplying oil for lubricating and/or cooling the upper bearings B1 and B2 to the upper bearings B1 and B2 and an oil discharge unit 161h for discharging oil from the upper bearings B1 and B2. Thereby, it is possible to prevent damage to the upper bearings B1 and B2, which rotatably support the cylinder 131, to prolong the lifespan of the upper bearings B1 and B2, and to cool the upper fixing block 161.

The third cooling part 161C rotatably supports and surrounds the pinch unit 120. The third cooling part 161C is provided with a separate cooling path 163a.

The pinching block 121 is provided in a pinch housing 123, which is configured to be rotatable, so as to be rotated together with the pinch housing 123. The pinch housing 123 is rotatably supported by a fixing block of the third cooling part 161C, i.e. the lower fixing block 163, which is fixed to the lower press die 20. The lower fixing block 163 is installed in the lower press die 20 in a fixed manner, and the pinch housing 123 is rotatably provided in the lower fixing block 163.

In order to rotate the pinch housing 123, a lower bearing B3 is provided in the lower fixing block 163 in order to rotatably support the pinch housing 123. The lower fixing block 163 of this embodiment includes a single integral body that is formed in the shape of a hollow ring that includes a side wall having an L-shaped cross-section. However, the invention is not limited thereto.

The lower fixing block 163 is provided with oil supply/discharge unit 163b and 163c for supplying or discharging oil for lubrication and/or cooling to or from the lower bearing B3 provided in the lower fixing block. The oil supply/discharge unit provided at the lower fixing block 163 may also function to cool the lower fixing block 163. The lower fixing block 163 may also be provided with a water-cooling-type cooling system or an air-cooling-type cooling system. And the cooling path 163a of the third cooling part is formed at the lower fixing block 163.

The second cooling part 160B is provided between the upper fixing block 161 and the lower fixing block 163 and receives the heating unit 120. The second cooling part 160B surrounds the heating unit 120, and another cooling path 162a for flowing of cooling fluid is provided at the second cooling part 160B.

The heating unit 110 is provided at an intermediate fixing block 162, more particularly a fixing block of the second cooling part 160B. The intermediate fixing block 162 covers the upper side and the circumference of the heating unit 120, and may also be provided with a cooling path 162a and a receiving part for containing the heating unit 120.

In this embodiment, the cooling path 162a formed in the intermediate fixing block is of a water-cooling type that cools the upper fixing block 162 by circulating water. However, other kinds of cooling fluid, such as oil or air, may alternatively be used. The aforementioned guide 140 is provided in the intermediate fixing block 162 so as to be driven by rotation of the cylinder 131 and the pinch housing 123. Thereby, the guide 140 is rotated simultaneously with the cylinder 131 and the pinch housing 123.

The lower end of the cylinder 131 is in contact with the upper end of the guide 140, and the pinch housing 123 may be in contact with the lower end of the guide 140. In other words, the lower end of the cylinder 131 is mounted on the upper end of the guide 140, and the lower end of the guide 140 is mounted on the pinch unit 120, particularly the pinch housing 123. In this embodiment, the guide 140 is driven by the cylinder 131 and/or the pinch housing 123 so as to be rotated at the same angular speed as the cylinder 131 and/or the pinch housing 123.

The cylinder 131 and the pinch housing 123 are simultaneously rotated at the same angle as each other. In this embodiment, the cylinder 131 and the pinch unit 120 are provided with pulleys of the driving unit 150.

Figure 13:
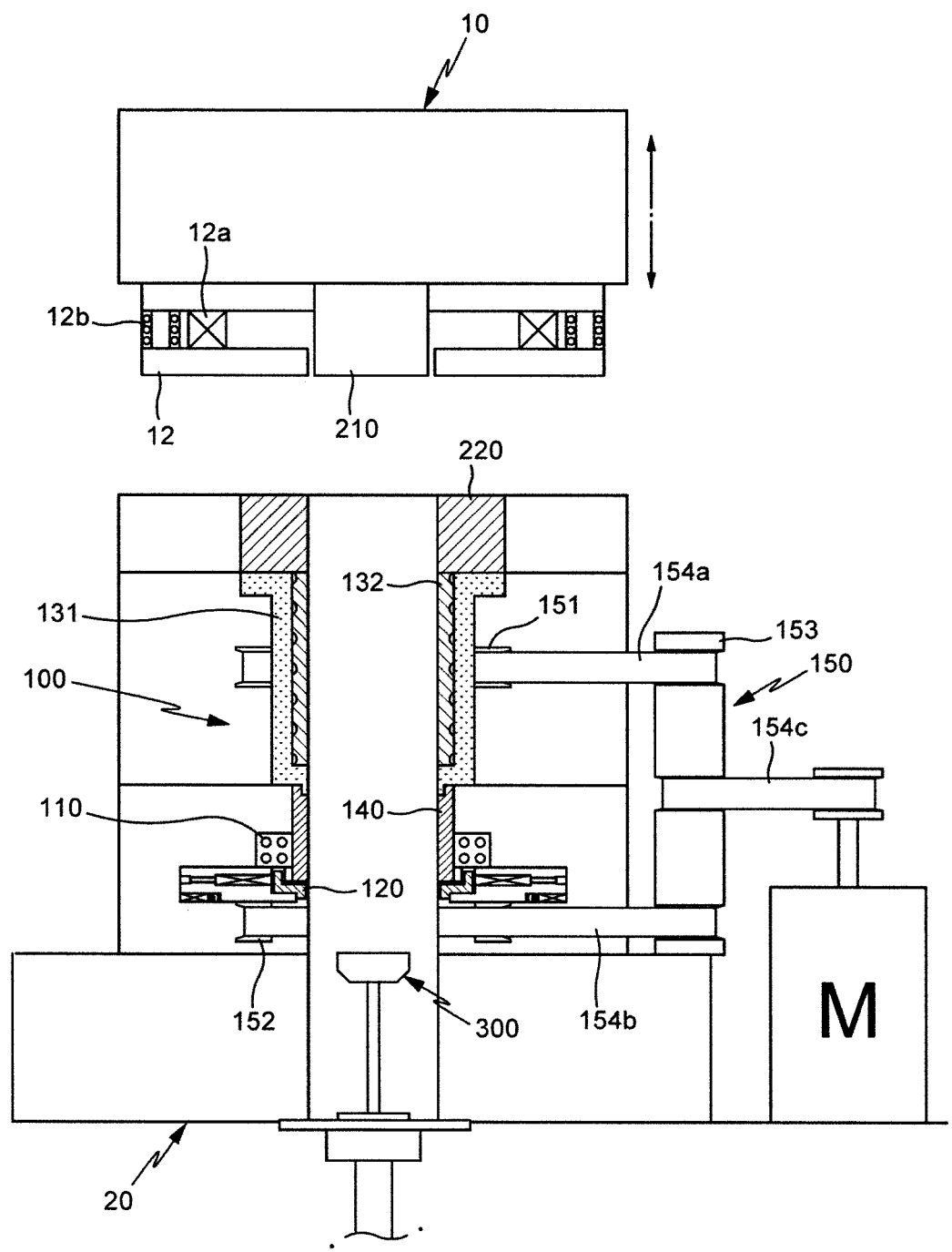
FIG. 13 is a view schematically illustrating a rotation mechanism of the core laminator shown in FIG. 3.
Figure 14:
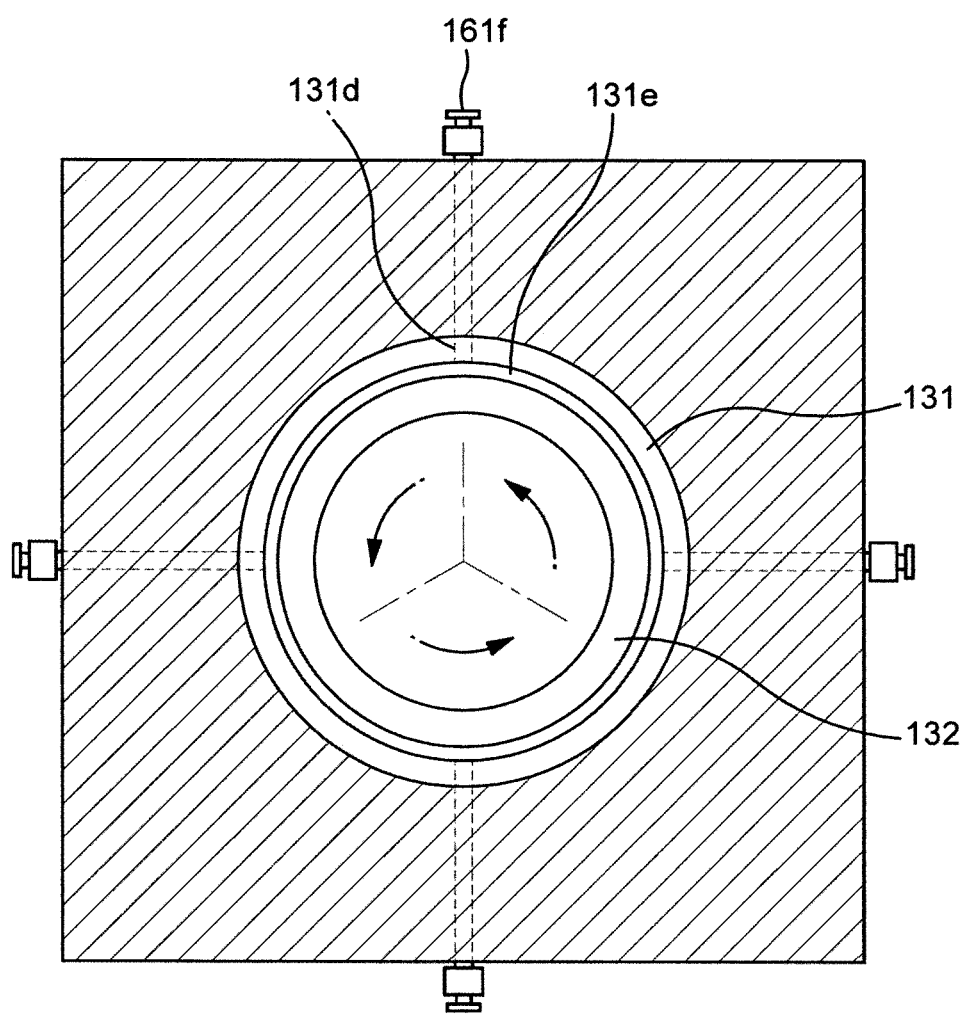
FIG. 14 is a plan view illustrating rotation movement of the core laminator shown in FIG. 3.

Referring to FIGS. 13 and 14, given that the pulley 151 fixed at the cylinder 131 is a first pulley and that the pulley 152 fixed at the pinch unit 120, particularly the pinch housing 123 is a second pulley, the first pulley 151 and the second pulley 152 are driven pulleys connected to a driving pulley 153, so that driving force is transmitted to the first pulley 151 and the second pulley 152 via the driving pulley 153.

More particularly, the first pulley 151 and the second pulley 152 have the same outer diameter as each other and are connected to a single driving pulley 153 via belts 154a and 154b, respectively, so that the cylinder 131 and the pinch housing 360 rotate at the same angular speed as each other.

The driving pulley 153 is rotated by a motor M, and the motor M and the driving pulley 153 are connected to each other via a driving belt 154c, i.e. a belt-pulley power transmission mechanism. However, the power transmission method is not limited thereto.

When the driving pulley 153 is rotated by driving force of a motor M, the cylinder 131 and the squeezer 132 may rotate at predetermined angle, for example, 120° shown in FIG. 14, at a predetermined timing.

The core manufacturing apparatus in accordance with the embodiment of the present invention is an apparatus that is capable of manufacturing a laminate core using a strip-type material including an adhesive layer applied on the surface thereof. For example, the core manufacturing apparatus in accordance with the embodiment of the present invention is an apparatus that is capable of manufacturing a laminate core using a steel strap (a self-bonding steel strap; an SB steel strap), on which an adhesive layer has been formed in a semi-cured state at a predetermined temperature or less. The core manufacturing apparatus manufactures a laminate core by sequentially forming laminar members by blanking the material, forming protrusions for interlayer division on the surface of the material at a predetermined interval by being interlocked with the blanking process, heating and melting adhesive layers present between the laminar members laminated in multiple layers, and hardening the adhesive layers.

The core manufacturing apparatus in accordance with the embodiment of the present invention further includes an interlayer division unit 400 for division of the laminate cores.

In this embodiment, the interlayer division unit 400 includes a protrusion-forming unit for forming a protrusion on the material, at a predetermined timing. Hereinafter, the same reference numerals are used to protrusion-forming unit and the interlayer division unit.

When manufacturing the aforementioned laminate core C using the strip-type material S including the adhesive layer 1 applied on the surface thereof, the protrusion-forming unit 400 forms protrusions P, particularly protrusions for interlayer division, at the material S by pressing the material so as to divide the laminate cores C into groups. The protrusions P form a gap between neighboring two laminar members in order to reduce the contact area between the laminar members.

In more detail, the upper press die 10 is provided above the lower press die 20 so as to be movable in the vertical direction in order to press and blank the material S. The blanking punch 210 is mounted to the upper press die 10, and is disposed further downstream than the protrusion-forming unit 400 in the transfer direction of the material S. Therefore, the blanking punch 210 blanks the material S by ascending and descending with the upper press die 10.

The protrusion-forming unit 400 forms the protrusion P on the material periodically. For example, the protrusion-forming unit 400 is configured to be selectively synchronized with the blanking unit 200 so as to form the aforementioned protrusions P on a surface or the other surface of the material S at every predetermined number of iterations of blanking.

The protrusion-forming unit 400 is synchronized with the blanking unit 200 whenever the material S is transferred by a predetermined multiple of a pitch so as to form the protrusions P on the material S. In the case in which the laminate core C has a 10-layer lamination structure including 10 laminar members, the protrusions P are formed in a regular pattern on the surface of the material S whenever the material is transferred by 10 pitches.

In this embodiment, the blanking die 220 is provided at the lower press die 20 so as to be spaced apart from the protrusion-forming unit 400 by an N-pitch distance (N being a natural number equal to or greater than 1) in the transfer direction of the material S.

The protrusion-forming unit 400 includes a protrusion-forming tool 410, which forms the protrusions P for interlayer division by pressing one surface of the material so that the protrusions P protrude from the opposite surface of the material, and a forming die 420, which is disposed so as to face the protrusion-forming tool 410. In order to form the protrusions P for interlayer division on the material S, the protrusion-forming tool 410 presses the material at a predetermined cycle by being synchronized with the blanking unit 200.

Referring to FIG. 1, the protrusion-forming tool 410 is provided at any one of an upper support frame 10a and a lower support frame 20a, which are disposed so as to face each other, and the forming die 420 is provided at the remaining one thereof. The material S passes through the space between the upper support frame 10a and the lower support frame 20a by 1 pitch at each cycle.

In this embodiment, the protrusion-forming tool 410 is provided at the lower frame 20a, and the forming die 420 is provided at the upper support frame 10a. However, this arrangement may be reversed as follows.

In this embodiment, the protrusion-forming tool 410 is provided at the lower frame 20a in order to press one surface, i.e. the lower surface, of the material S upwards, and the forming die 420 is provided at the upper frame 10a in order to support the opposite surface, i.e. the top surface of the material S. The protrusion-forming tool 410 presses one surface, i.e. the lower surface of the material S upwards, at a predetermined cycle by being synchronized with the blanking unit 200.

Therefore, according to this embodiment, the protrusions P for interlayer division protrude upwardly from the upper surface (the top surface) of the material S. The protrusion-forming unit 400 of this embodiment may be referred to as an embossing apparatus that locally presses one surface of a material so that protrusions protrude from the opposite surface of the material.

The upper support frame 10a may have a structure that is provided separately from the upper press die 10, or may be formed integrally with the upper press die 10, like the embodiment shown in FIG. 2. For example, the upper support frame 10*a* may serve as a part of the upper press die 10 and may therefore move (ascend and descend) integrally with the upper press die 10.

The lower support frame 20*a* may also have a structure that is provided separately from the lower press die 20 so as to be spaced apart therefrom, or may be formed integrally with the lower press die 20, like the embodiment shown in FIG. 2.

The material S may be a material coated with the adhesive layer 1 on both surfaces (the top surface and the bottom surface) thereof, or may be a material coated with the adhesive layer on any one of the top surface and the bottom surface thereof. The apparatus according to this embodiment is configured to manufacture a laminate core using the material S coated with the adhesive layer 1 on both surfaces thereof.

In the case in which the protrusions P for interlayer division are periodically formed on only one of the top surface and the bottom surface of the material S in one direction, the contact area between the laminar member, which is in contact (for example, point contact) with the protrusions for interlayer division, and the laminar member, on which the protrusions for interlayer division are formed, is reduced, thus facilitating interlayer division and integration of a predetermined number of laminar members into one body.

As described above, the forming die 420 is provided at the upper support frame 10*a*. In the case in which the upper support frame 10*a* is formed integrally with the upper press die 10, that is, as shown in FIG. 2, in the case in which the upper support frame 10*a* is a part of the upper press die 10, both the forming die 420 and the blanking punch 210 are provided at the upper press die 10.

And, the protrusion-forming tool 410 is provided at the lower support frame 20*a* so as to press the lower surface of the material S upwardly. In the case in which and the lower support frame 20*a* is formed integrally with the lower press die 20, that is, as shown in FIG. 2, in the case in which the lower support frame 20*a* is a part of the lower press die 20, both the protrusion-forming tool 410 and the blanking die 220 are provided at the lower press die 20.

The protrusion-forming tool 410 is located directly under the forming die 420 so as to face the forming die 420, and the forming die 420 ascends and descends with the upper press die 10.

Figure 15:
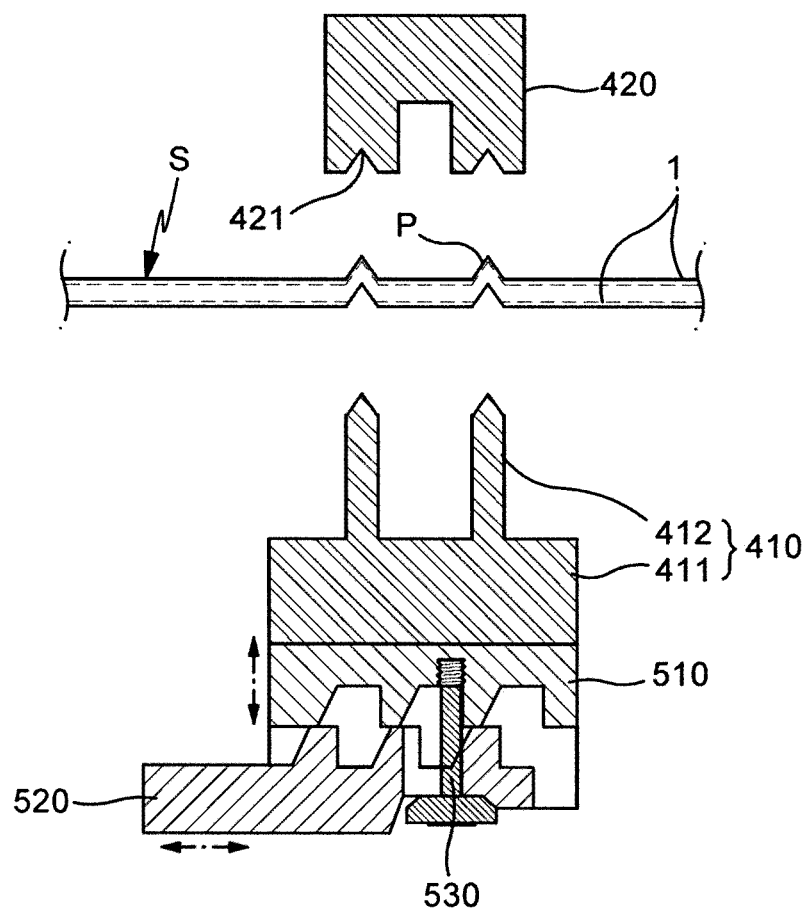
FIG. 15 is a view illustrating one embodiment of an interlayer division unit that is applicable to the adhesive laminate core manufacturing apparatus shown in FIGS. 1 and 2.

Referring to FIGS. 1, 2, and 15, the forming die 420 includes a forming recess 421, which is indented upwards from the bottom surface of the forming die 420. In this embodiment, a plurality of the forming recesses 421 are formed in the bottom surface of the forming die 420. The protrusion-forming tool 410 includes pressing protrusions which face the forming recesses 421.

The protrusion-forming tool 410 is provided at the lower support frame 20*a* so as to be capable of being raised and lowered. As described above, in the case in which the lower support frame 20*a* is formed integrally with the lower press die 20, the protrusion-forming tool 410 is provided at the lower press die 20 so as to be capable of being raised and lowered.

To this end, the lower press die 20 is provided with a tool-receiving portion 20*b*, and the protrusion-forming tool 410 is provided in the tool-receiving portion 20*b* so as to be capable of being raised and lowered. In this embodiment, the protrusion-forming tool 410 includes a tool base 411 capable of being raised and lowered and a pressing part 412, i.e. a pressing protrusion provided at the tool base 411. The tool base 411 is installed in the tool-receiving portion 20*b* so as to be capable of being raised and lowered, and the front end (the upper end) of the pressing part 412 has a shape corresponding to the shape of the forming recess 421.

In this embodiment, the forming recess 421 may have a triangular shaped cross-section. However, the shape of the forming recess 421 is not limited thereto. For example, the forming recess 421 may be formed in various other shapes, such as a semi-circular shape, a semi-elliptical shape, etc. It is more desirable to determine the shapes of the forming recesses so as to minimize the contact area at the interface of interlayer division.

As described above, the upper press die 10 may include a plurality of bodies, which are divided in the transfer direction of the material S, or may include a single integral body. The lower press die 20 may also include a plurality of bodies, which are divided in the transfer direction of the material S, or may include a single integral body. The core manufacturing apparatus shown in FIG. 2 has a press structure that includes an integral-type upper press die and an integral-type lower press die.

In this embodiment, the upper press die 10 is provided with a pressing member, i.e. a pusher, to push the material S toward the lower press die 20. When the upper press die 10 descends, the top surface of the material S is pushed down by the pusher 12, and the material S is therefore pressed toward the lower press die 20.

The upper press die 10 includes an upper frame 11, which is provided above the lower press die 20 so as to be capable of being raised and lowered, and the pusher 12, which is provided under the upper frame 11. In this embodiment, the blanking punch 210 and the pusher 12 are provided at the upper press die 10, particularly at the upper frame 11.

In this embodiment, the pusher 12 is a compressing plate or a pressing plate, which functions as a stripper during a blanking process and a piercing process and which pushes the material S toward the lower press die 20 for a protrusion-forming process and a blanking process. That is, in this embodiment, the pusher is a pushing plate having a plate configuration.

Further, an elastic member 12*a* (for example, a coil spring) for elastically pressing the pusher 12 and an up/down guide 12*b* for guiding ascent and descent of the pusher 12 are provided between the pusher 12 and the upper frame 11.

The lower press die 20 includes a base frame 21 (a bolster), which is a bottom portion of the lower press die 20, and lower dies 22 and 23, which are provided on the base frame.

In this embodiment, the protrusion-forming tool 410 is mounted in the lower dies 22 and 23. The lower dies 22 and 23 may be divided into a die frame 22, which is a top portion of the lower press die, and a die holder 23, which is provided under the die frame 22.

The die holder 23 supports the die frame 22, and is disposed on the base frame so as to be supported by the base frame. However, the structure of the lower press die 20 is not limited thereto. The die holder 23 may be divided into a plurality of parts. In this embodiment, the blanking die 220 and the protrusion-forming tool 410 are mounted in the lower dies 22 and 23.

The forming die 420 is supported by the upper frame 11 and penetrates the pusher 12 so as to support the top surface of the material S. To this end, the pusher 12 includes a die hole 12*e*, through which the forming die 420 passes.

The protrusion-forming tool 410 is raised and lowered by an elevating device 500, such as a cam mechanism or hydraulic/pneumatic cylinder, whereby the vertical positions of the protrusion-forming tool 410 is adjusted. That is, when the protrusions need to be formed, the front end of the protrusion-forming tool 410 is raised and protruded upwards by the elevating device 500 so as to go above the top surface of the lower press die 20.

In other words, in the state in which the protrusion-forming tool 410 is moved (protruded) toward the material S at a predetermined cycle by the elevating device 500, when the upper press die 10 is lowered, the material S is lowered by the pusher 12 and the bottom surface of the material S is pressed upwards by the protrusion-forming tool 410. In this embodiment, the elevating device 500 is provided in the tool-receiving portion 20b of the lower press die, and is coupled to the protrusion-forming tool 410.

Therefore, the protrusion-forming tool 410 is raised to the top dead center at a predetermined cycle by the elevating device 500. When the protrusion-forming process is completed, the protrusion-forming tool 410 is pulled back by the elevating device 500 and prevented from coming into contact with the material S until a subsequent cycle.

In more detail, in the case in which the laminate core C has a 10-layer structure including 10 laminar members, the protrusion-forming process is executed once whenever the material S moves 10 pitches and, thereby, interlayer division of the laminate cores C into groups may be realized. To this end, the elevating device 500 raises the protrusion-forming tool once whenever the material S moves 10 pitches.

In the lamination structure of the laminar members shown in FIG. 2, the dotted line represents a portion in which interlayer adhesion is executed, and the solid line represents a portion in which interlayer division is executed by the protrusions P. The protrusion P is formed at the lower laminar member of the two laminar members that are adjacent to each other at the portion represented by the solid line.

Referring to FIG. 15, the elevating device 500 in accordance with this embodiment includes an elevating body 510, which supports the protrusion-forming tool 410 and is provided in the tool-receiving portion 20b of the lower press die so as to be capable of being raised and lowered, and a lifter 520 for raising and lowering the elevating body 510.

In this embodiment, the elevating body 510 is fixed to the protrusion-forming tool 410 so that the protrusion-forming tool 410 moves integrally with the elevating body 510. The elevating body 510 is coupled with an elevating rod 530, which penetrates the lifter 520 in the vertical direction.

The elevating device 500 in accordance with this embodiment is configured as a cam mechanism, and is operated such that the elevating body 510 is raised and lowered by sliding movement of the lifter 520 in the lateral direction. In other words, the elevating body 510 and the elevating rod 530 ascend and descend in place, and the movement of the elevating body 510 in the vertical direction is realized by the movement of the lifter 520 in the lateral direction. However, the structure and operating mechanism of the elevating device are not limited to the above description.

Hereinafter, with reference to FIGS. 16 and 17, the operation of the interlayer division unit 400, i.e. the protrusion-forming unit 100 in accordance with this embodiment will be described in more detail.

The material S moves a predetermined distance (1 pitch) at each cycle, i.e. per pressing stroke of the upper press die 10, and passes through the space between the pusher 12 and the die frame 22. As shown in (a) of FIG. 16, the protrusion-forming tool is raised to the top dead center by the elevating device 500 at the same time as or shortly before a predetermined portion of the material S reaches the protrusion-forming position.

Figure 16:
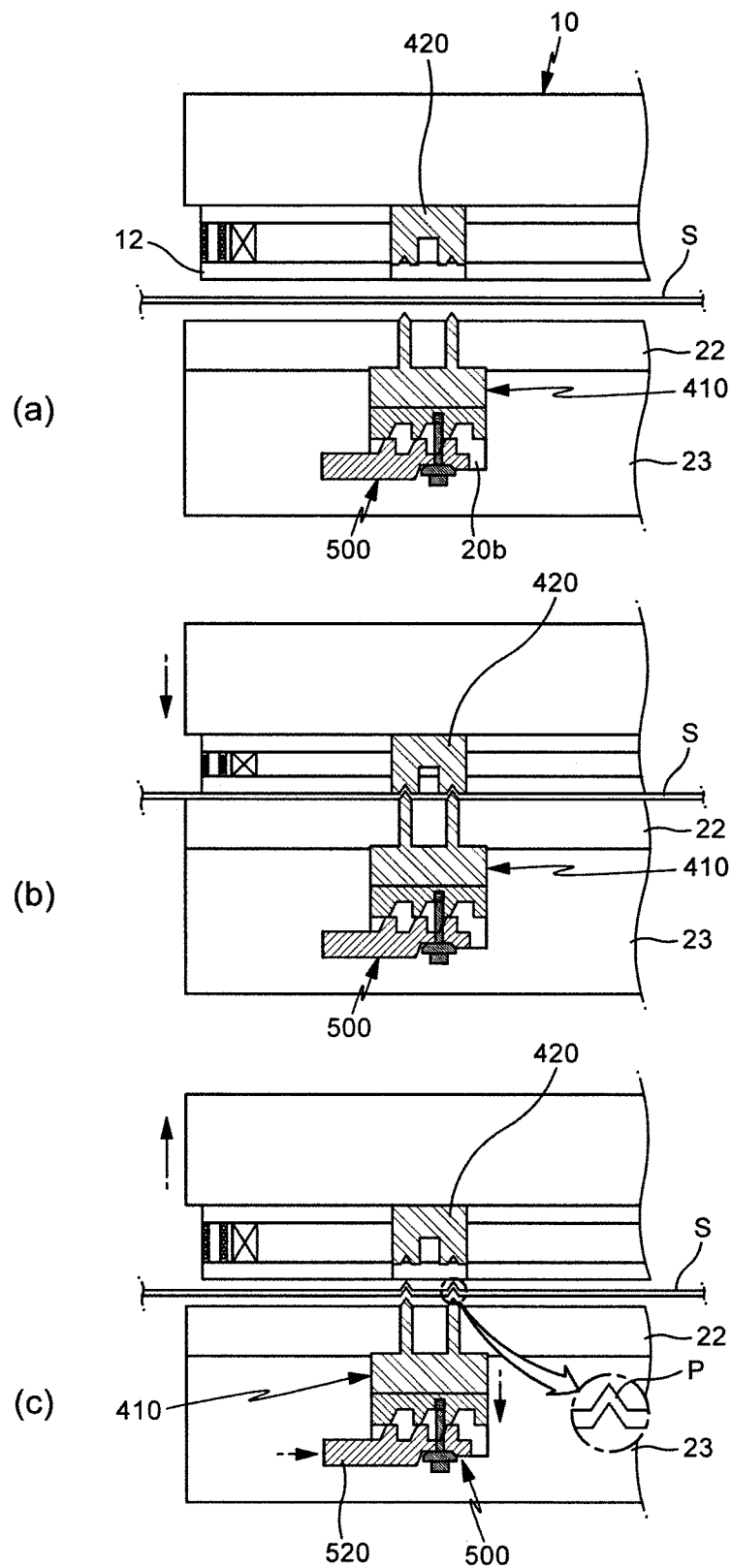
FIG. 16 is a view illustrating the process of forming protrusions for interlayer division on the material by the interlayer division unit shown in FIG. 15.

As shown in (b) of FIG. 16, when the upper press die 20 descends, the top surface of the material S is pushed by the pusher 12, and the bottom surface of the material S comes into close contact with the lower press die 20. At this time, the protrusion-forming tool 410 presses the bottom surface of the material S and forms the protrusion P in cooperation with the forming die 420. And the blanking unit 200 performs a blanking process simultaneously with the protrusion-forming process.

An image shown in (c) of FIG. 16 is a view illustrating the state in which the upper press die 10 ascends after the protrusions P is formed on the top surface of the material S. The protrusion-forming tool 410 descends to the bottom dead center, at the same time as the ascent of the upper press die 10 or shortly after the ascent of the upper press die 10.

Figure 17:
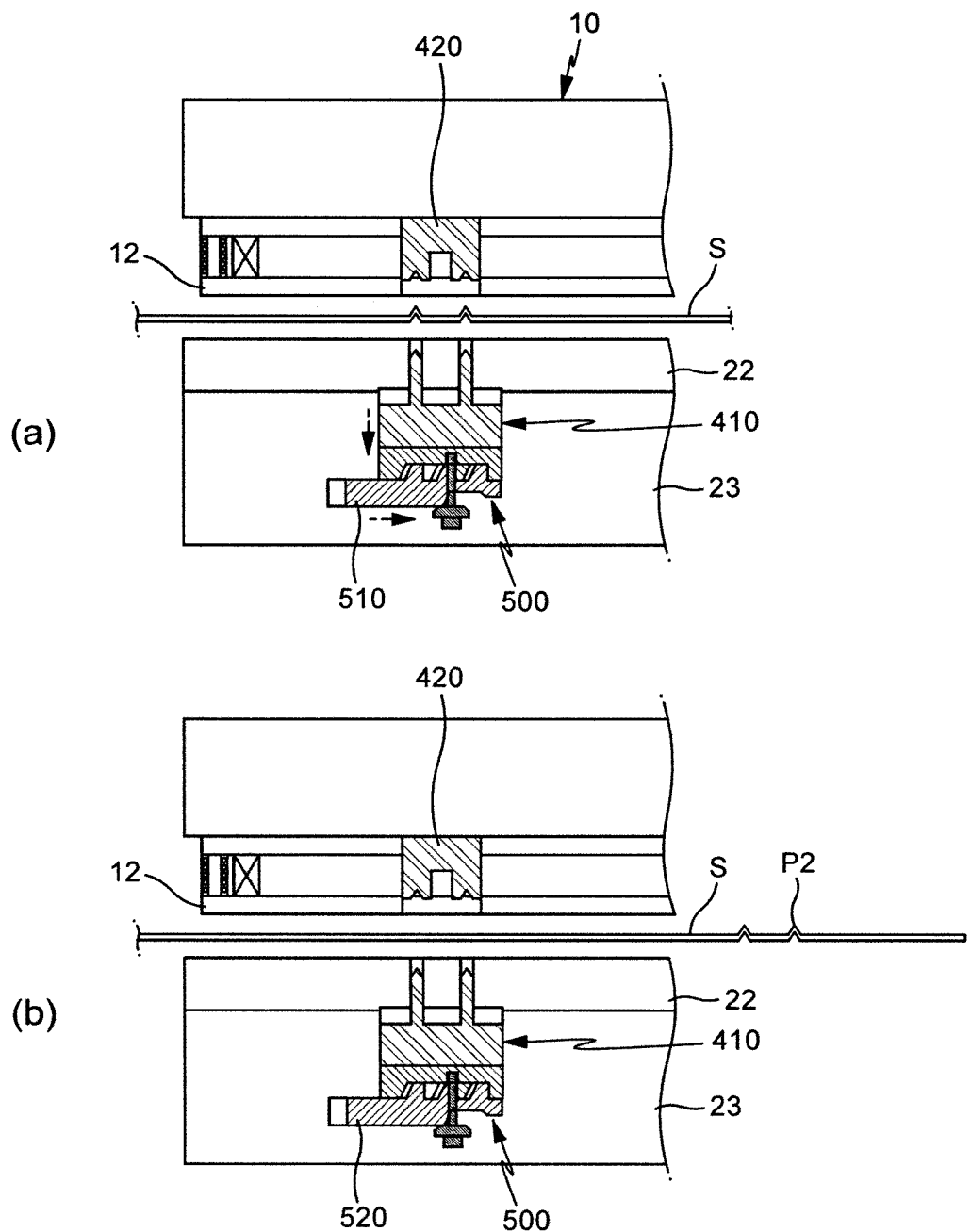
FIG. 17 is a view illustrating the state in which the protrusion-forming tool of the interlayer division unit shown in FIG. 15 is moved back (down)

FIG. 17(a) is a view illustrating the state in which the protrusion-forming tool 410 descends in order to prevent the protrusion-forming tool 410 from coming into contact with the material even when the upper press die 10 descends and presses the material S. As shown in (b) of FIG. 17, the protrusion-forming process is not performed during certain predetermined cycles.

Figure 18:
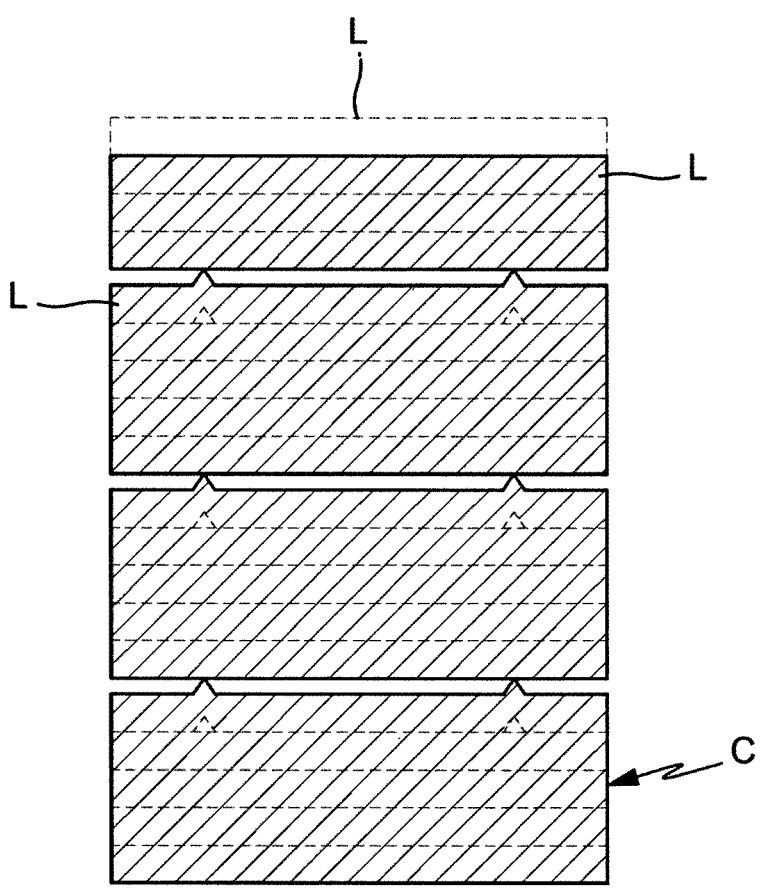
FIG. 18 is a view illustrating the laminated state of laminar members formed by the adhesive laminate core manufacturing apparatus shown in FIG. 15.

FIG. 18 is a view illustrating the laminated state of laminar members formed by the adhesive laminate core manufacturing apparatus according to the embodiment of the present invention. Referring to FIG. 18, the laminate cores C may be divided at the boundary between a laminar member including the protrusion P for interlayer division, which protrude upwards, and another laminar member L disposed thereon.

The protruding height of the protrusion P is not limited to a specific value as long as interlayer division can be realized. After the laminate core C is discharged from the core manufacturing apparatus in accordance with this embodiment, the protrusions may be eliminated by pressing the laminate core C using a separate press. As shown in FIGS. 1 and 2, the blanking punch 210 may include escape recesses 211 formed in the surface (the bottom surface) thereof in order to prevent the protrusions P from being pressed.

Figure 19:
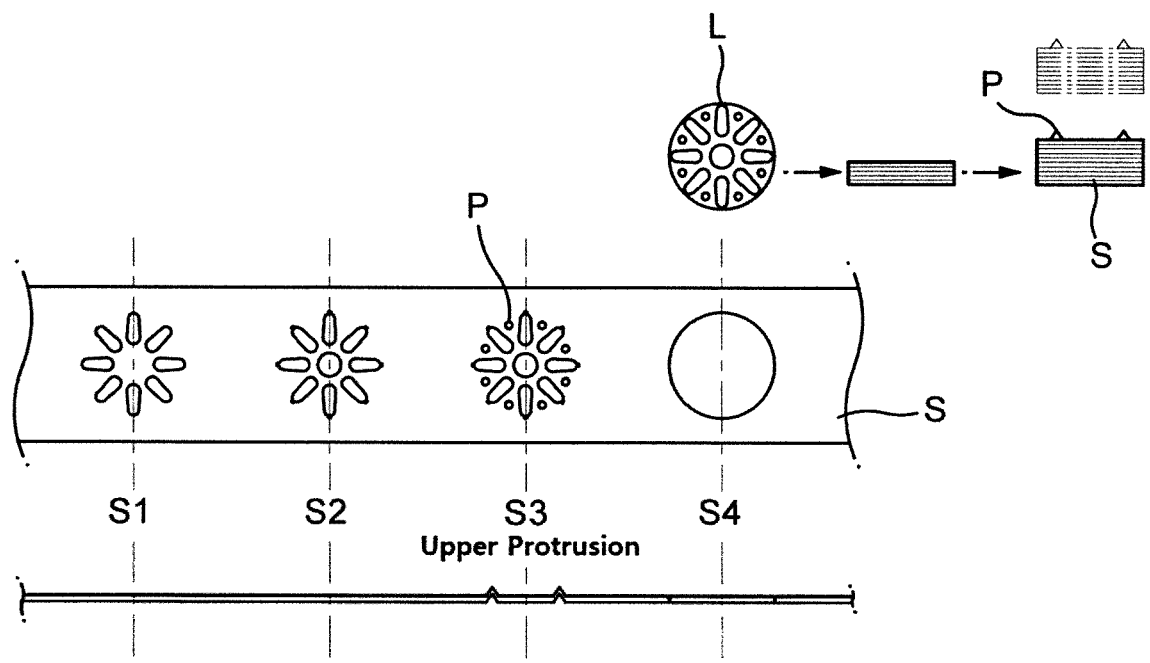
FIG. 19 is a view illustrating the process of manufacturing the exemplary laminate core shown in FIG. 9.

FIG. 19 is a process diagram illustrating an exemplary process of forming the laminar member shown in FIG. 6. In order to form the laminar member shown in FIG. 6, the material S sequentially undergoes piercing processes S1 and S2, a protrusion-forming process S3 and a blanking process S4 while being transferred. At this time, the protrusion-forming process is selectively performed at an interval equivalent to a predetermined multiple of a pitch, for forming the protrusion. The procedure in which the laminar member L is formed is not limited to the above description.

Figure 20:
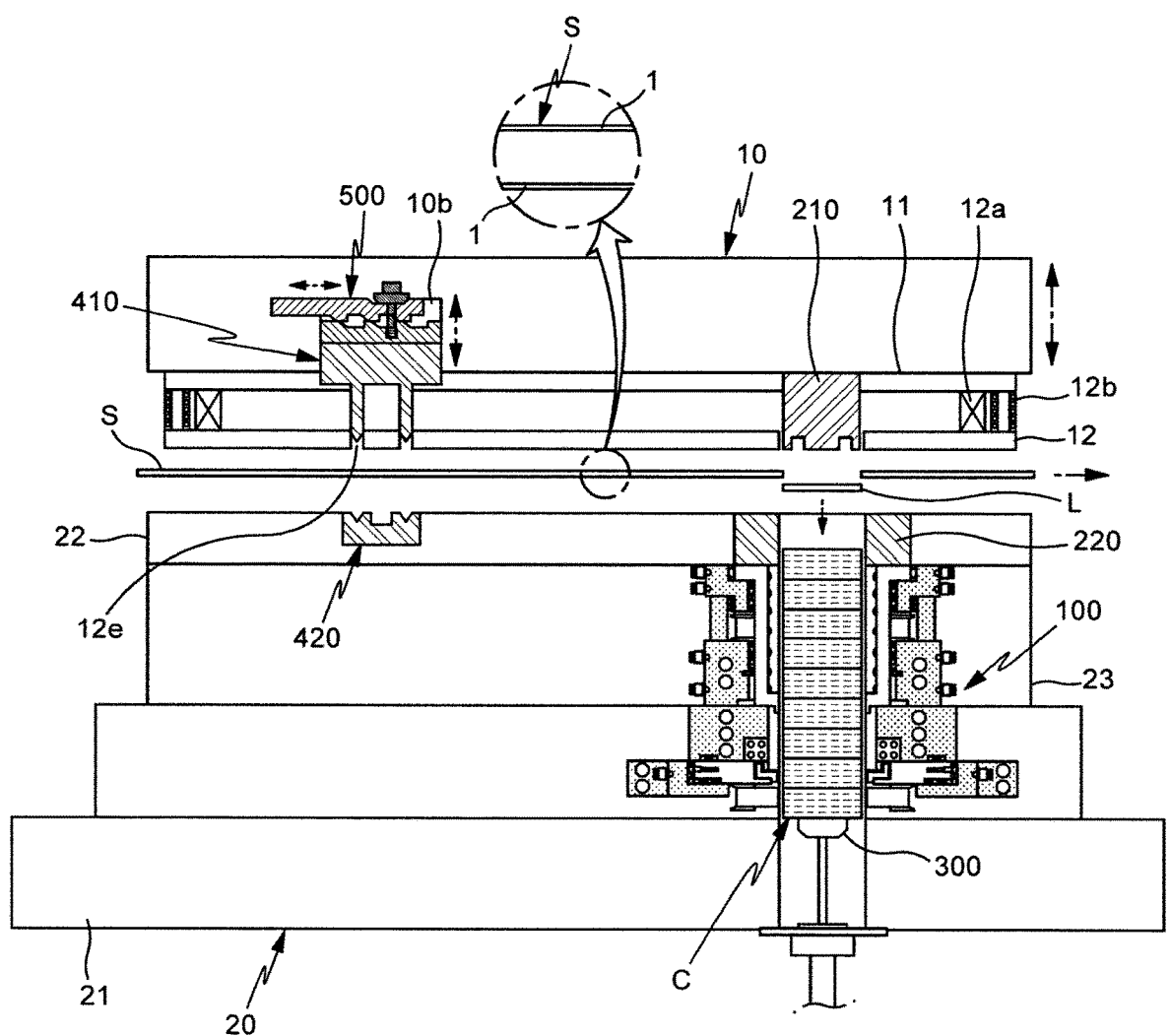
FIG. 20 is a view illustrating an adhesive laminate core manufacturing apparatus in accordance with yet another embodiment of the present invention.
Figure 21:
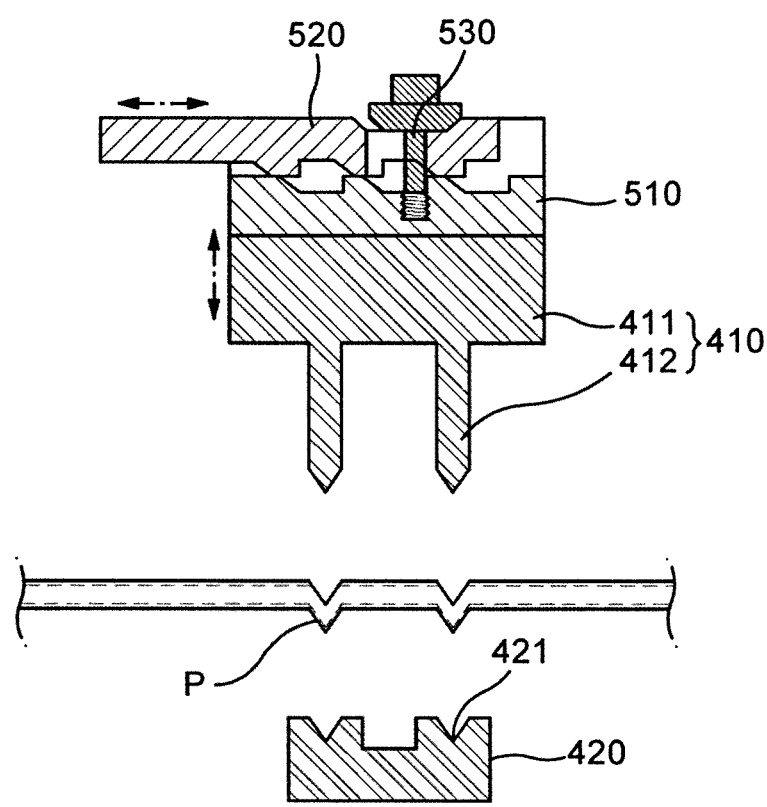
FIG. 21 is a view illustrating an interlayer division unit of the adhesive laminate core manufacturing apparatus shown in FIG. 20.
Figure 22:
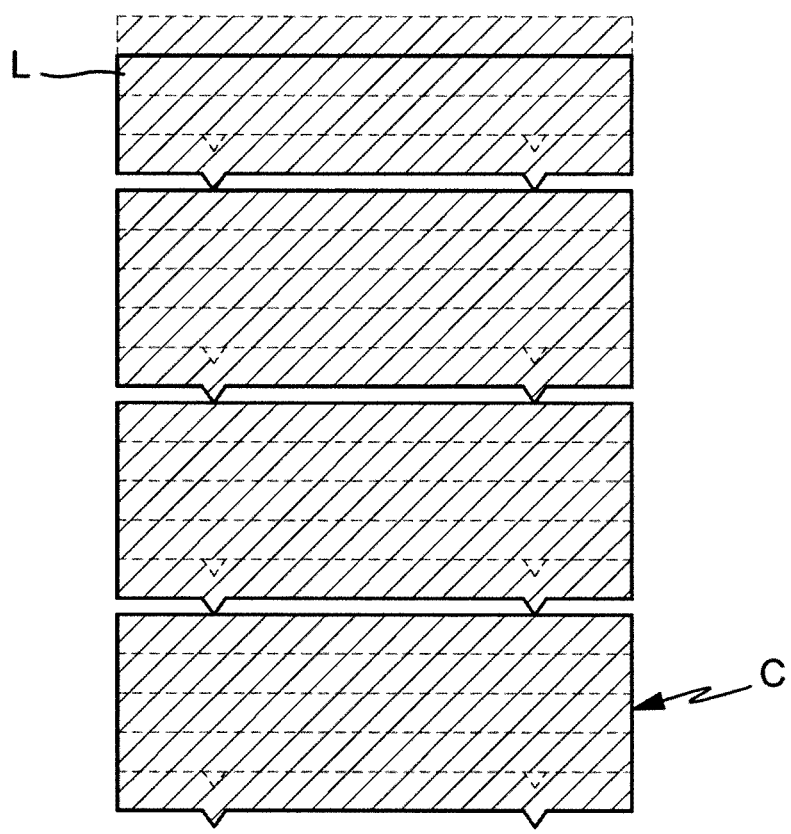
FIG. 22 is a view illustrating the laminated state of laminar members formed by the adhesive laminate core manufacturing apparatus shown in FIG. 20.

Referring to FIGS. 20 to 22, the protrusion-forming Unit 400 includes a protrusion-forming tool 410 provided at the upper press die 10 and a forming die 420 provided at the lower press die 20.

The protrusion-forming tool 410 may be provided at the upper support frame 10a separated and spaced from the upper press die 10 the shown in FIG. 1, and the forming die 420 may be provided at the lower support frame 20a separated and spaced from the lower press die 20. In other words, the protrusion-forming tool 410 and the blanking punch 210 may be provided at different structures separated from each other, and the forming die 420 and the blanking die 220 may also be provided at different structures separated from each other.

In this embodiment, a part supporting the protrusion-forming tool 410, i.e. the upper support frame is a portion of the upper press die 10, and a part supporting the forming die 420, i.e. the lower support frame is a portion of the lower press die 20. The protrusion-forming tool 410 is provided at the upper press die 10, together with the blanking punch 210. And the forming die 420 is provided at the lower press die 20, together with the blanking die 220.

In this embodiment, the protrusion-forming tool 410 is an element pressing the top surface of the material S downwardly, so that the protrusion-forming unit 400 forms at least one protrusion P for interlayer division of the laminate cores C, which is projected downwardly at the lower surface of the material S.

More particularly, the protrusion-forming tool 410 is located directly above the forming die 420 so as to face the forming die 420, and is provide at the upper press die 10 so as to ascend and descend with the upper press die 10.

In this embodiment, the forming die 420 includes a forming recess 421, which is depressed downwards from the top surface of the lower forming die 420. A plurality of the forming recesses 421 is formed in the top surface of the forming die 420. And the upper press die 10 is provided with a tool receiving portion 10b containing the protrusion-forming tool 410, the protrusion-forming tool 410 is elevatably provided at the tool receiving portion 10b.

The protrusion-forming tool 410 is provided at the upper press die 10 so as to be elevatable. In this embodiment, the protrusion-forming tool 410 includes an elevatable tool base 411 and a pressing part 412 provided at the tool base 411, and the front end (the lower end) of the pressing part 412 includes a plurality of pressing protrusions having a shape corresponding to the shape of the forming recess 421.

The protrusion-forming tool 410, particularly the pressing part 412 is supported by the upper press die 10 and penetrates the pusher 12 so as to press the top surface of the material S. And, the pusher 12 includes tool holes 12e, through which the pressing part 412.

The protrusion-forming tool 410 is raised and lowered by an elevating device 500, such as a cam mechanism or hydraulic/pneumatic cylinder, whereby the vertical positions of the protrusion-forming tool 410 is adjusted. That is, when the protrusions need to be formed, the protrusion-forming tool 410 is lowered by the elevating device 500 to the bottom dead center.

In other words, in the state in which the protrusion-forming tool 410 is lowered toward the material S at a predetermined cycle by the elevating device 500, when the upper press die 10 is lowered, the top surface of the material S may be pressed downwards by the protrusion-forming tool 410. In this embodiment, the elevating device 500 is provided in the tool-receiving portion 10b of the upper press die and is coupled to the protrusion-forming tool 410.

Therefore, the protrusion-forming tool 410 is lowered to the bottom dead center at a predetermined cycle by the elevating device 500. When the protrusion-forming process is completed, the protrusion-forming tool 410 is pulled back by the elevating device 500 and prevented from coming into contact with the material S until a subsequent cycle.

Referring to FIG. 21, the elevating device 500 in accordance with this embodiment includes an elevating body 510 supporting the protrusion-forming tool 410 and provided in the tool-receiving portion 10b of the upper press die so as to be elevatable, and a lifter 520 for raising and lowering the elevating body 510.

In this embodiment, the elevating body 510 is fixed to the protrusion-forming tool 410, particularly the tool base 411 so that the protrusion-forming tool 410 moves integrally with the elevating body 510. The elevating body 510 is coupled with an elevating rod 530, which penetrates the lifter 520 in the vertical direction. The operation of the elevating device 500 is same with that of the aforementioned embodiment so that repetitive description about the elevating device 500 is omitted.

FIG. 22 is a view illustrating the laminated state of the laminar members formed by the core manufacturing apparatus in accordance with this embodiment. The laminate cores C may be divided at the boundary between a laminar member including the protrusions for interlayer division, which protrude downwards, and another laminar member L disposed thereunder.

Other elements except the protrusion-forming tool 410 for this embodiment are same to elements for the aforementioned embodiment, so that the same terms and the same reference numerals are used to describe the same configurations, and additional descriptions thereof will be omitted.

The interlayer division unit for the laminate core manufacturing apparatus using a strip-shaped material comprising an adhesive layer applied on a surface thereof, is not limited to the above embodiments. For example, an interlayer division unit scraping/heating the material locally for eliminating adhesive force or using release paper, can be used for the laminate core manufacturing apparatus.

The embodiments shown in FIGS. 1, 2 and 20 are the laminate core manufacturing apparatus using a strip-shaped material comprising an adhesive layer applied on a surface thereof. However, the core laminator according to aforementioned embodiments of the present invention is applicable to other laminate core manufacturing apparatus using a material without an adhesive layer, for example, to the laminate core manufacturing apparatus disclosed in Japanese Patent No. 5323400, Japanese Patent Laid-open Publication No. H5-304037, Korean Patent No. 10-1599291, or Korean Patent No. 10-1566492, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Therefore, it should be understood by those skilled in the art that these embodiments are given by way of illustration only and the present invention is not limited thereto, and that various modifications, variations, and alterations can be made by those skilled in the art without departing from the spirit and scope of the present invention. Therefore, the scope of the invention should be limited only by the accompanying claims and equivalents thereof.

INDUSTRIAL APPLICABILITY

The present invention relates to a core manufacturing apparatus, which manufactures a core used as a rotor or stator of a motor or a generator, is applicable to a device for manufacturing laminate core, and precise stack and interlayer adhesion of the laminar members formed by blanking process is practicable.

The invention claimed is:
1. A core laminator of an adhesive laminate core manufacturing apparatus for integrating laminar members to pass therethrough, thereby forming laminate cores, the core laminator comprising:

a heating unit heating an adhesive interposed between the laminar members, so as to integrate the laminar members in a plurality of sheets into one body and form a laminate core;

a pinch unit having a hollow shape, rotatably provided at a lower side of the heating unit, and applying lateral pressure to the laminate core for preventing the laminate core from falling rapidly;

a squeeze unit including a cylinder rotatably provided at an upper side of the heating unit, and a squeezer having a hollow shape and fixed in the cylinder, the squeezer coaxially aligning the laminar members in a straight line from above the heating unit;

a guide for guiding movement of the laminar members within the heating unit, provided in the heating unit and rotated by the pinch unit and the squeeze unit; and a driving unit for rotation connected to the pinch unit and the squeeze unit, so as to selectively rotate the pinch unit and the squeeze unit simultaneously at the same angle;

wherein the squeeze unit applies lateral pressure to the laminar members and squeezes the laminar members, so that the laminar members pass through inside of the squeezer in the state of interference fit into the squeezer.

2. The core laminator according to claim 1, further comprising a cooling system provided at a lower press die, wherein the lower press die supports the heating unit, the pinch unit, and the squeeze unit.

3. The core laminator according to claim 2, wherein the squeezer is fixed at inside of the cylinder, and moves integrally with the cylinder.

4. The core laminator according to claim 3, wherein the squeezer includes a squeeze ring having a hollow shape passed through in the vertical direction and fixed in the cylinder, and wherein an outer circumferential surface of the squeeze ring is in close contact with an inner circumferential surface of the cylinder.

5. The core laminator according to claim 4, wherein the squeeze unit further includes a cooling path which guides spiral flow of cooling fluid at the interface between the cylinder and the squeeze ring, and wherein the cooling path is connected with the cooling system and guides the flow of the cooling fluid from inflow portion of the cooling path to a discharge portion of the cooling path formed at the interface between the cylinder and the squeeze ring.

6. The core laminator according to claim 5, wherein the cooling path includes a spiral cooling groove which is formed at the outer circumferential surface of the squeeze ring, the spiral cooling groove being formed in the spiral direction from an upper end of the squeeze ring to a lower end of the squeeze ring, and wherein the spiral cooling groove connects the inflow portion and the discharge portion of the cooling path.

7. The core laminator according to claim 5, wherein the cylinder includes;

an intake groove formed in annular shape at the outer circumferential surface of the cylinder, so as to supply the cooling fluid, a discharge groove formed in annular shape at the outer circumferential surface of the cylinder, so as to discharge the cooling fluid, a fluid supply hole formed at the intake groove, penetrating the cylinder, and connected to the inflow portion of the cooling path, and a fluid discharge hole formed at the discharge groove, penetrating the cylinder, and connected to the discharge portion of the cooling path.

8. The core laminator according to claim 7, wherein the inflow portion and the discharge portion of the cooling path are spaced apart from each other, the inflow portion and the discharge portion being formed in annular shape at the interface between the cylinder and the squeeze ring.

9. The core laminator according to claim 7, wherein a blanking die is fixed on an upper end of the cylinder and moves integrally with the cylinder, wherein any one of the fluid supply hole and a fluid discharge hole is connected to an exposed flow path formed at the upper end of the cylinder, so that the cooling fluid under flowing comes into contact with lower surface of the blanking die, and wherein the exposed flow path is covered by the blanking die.

10. The core laminator according to claim 2, wherein the cooling system includes;

a first cooling part supporting rotation of the cylinder and cooling the squeeze unit and supporting rotation of the cylinder, a second cooling part surrounding the heating unit, and a third cooling part surrounding the pinch unit and supporting the rotation of the pinch unit.

11. The core laminator according to claim 10, wherein each of the first cooling part, second cooling part, and the third cooling part has a cooling path which guides flow of cooling fluid.

12. The core laminator according to claim 11, wherein the second cooling part includes a fixing block which has a receiving part for containing the heating unit and covers an upper side and a circumference of the heating unit, and wherein the second cooling part is provided with the cooling path.

13. The core laminator according to claim 1, wherein a lower end of the cylinder is mounted on an upper end of the guide, and wherein a lower end of the guide is mounted on the pinch unit.

14. The core laminator according to claim 1, wherein the driving unit includes;

a first pulley provided at the cylinder, a second pulley fixed at the pinch unit, and a driving pulley connected to the first pulley and the second pulley, so as to simultaneously transmit driving force to the first pulley and the second pulley.

15. An adhesive laminate core manufacturing apparatus comprising:

a blanking unit for blanking a material which is continuously transferred, and sequentially forming laminar members; and a core laminator provided at a lower press die, for integrating the laminar members to pass therethrough, thereby forming laminate cores, wherein the blanking unit includes;

a blanking punch provided at an upper press die which is elevatable, and a blanking die provided at the upper press die and facing the blanking punch, and wherein the core laminator includes;

a heating unit for hardening an adhesive interposed between the laminar members, so as to integrate the laminar members in a plurality of sheets into one body and form a laminate core;

a pinch unit having a hollow shape, rotatably provided at a lower side of the heating unit, and applying lateral pressure to the laminate core for preventing the laminate core from falling rapidly;

a squeeze unit including a cylinder rotatably provided at an upper side of the heating unit, and a squeezer having a hollow shape and fixed in the cylinder, the squeezer coaxially aligning the laminar members in a straight line from above the heating unit;

a guide for guiding movement of the laminar members within the heating unit, provided in the heating unit and rotated by the pinch unit and squeeze unit; and a driving unit connected to the pinch unit and the squeeze unit, so as to selectively rotate the pinch unit and the squeeze unit simultaneously at the same angle;

wherein the squeeze unit applies lateral pressure to the laminar members and squeezes the laminar members, so that the laminar members pass through inside of the squeezer in the state of interference fit into the squeezer.

\* \* \* \* \*